May 9, 1967 J. S. KAMBORIAN ETAL Re. 26,200

APPARATUS FOR LASTING FOOTWEAR

Original Filed April 5, 1961 11 Sheets-Sheet 1

INVENTORS
Henry v.d. Berken
Robert B. Dunlap
Jacob S. Kamborian
BY Albert Gordon
ATTY

APPARATUS FOR LASTING FOOTWEAR

Original Filed April 5, 1961 11 Sheets-Sheet 6

APPARATUS FOR LASTING FOOTWEAR

Original Filed April 5, 1961 11 Sheets-Sheet 8

APPARATUS FOR LASTING FOOTWEAR

Original Filed April 5, 1961 11 Sheets-Sheet 9

APPARATUS FOR LASTING FOOTWEAR

Original Filed April 5, 1961 11 Sheets-Sheet 10

APPARATUS FOR LASTING FOOTWEAR

Original Filed April 5, 1961

United States Patent Office

Re. 26,200

Reissued May 9, 1967

26,200

APPARATUS FOR LASTING FOOTWEAR

Jacob S. Kamborian, 70 Crestwood Road, West Newton, Mass. 02165, Robert B. Dunlap, Midway, and Henry v. d. Benken, West Roxbury, Mass.; said Dunlap and said Benken assignors to said Kamborian Original No. 3,165,771, dated Jan. 19, 1965, Ser. No. 100,979, Apr. 5, 1961. Application for reissue Aug. 16, 1966, Ser. No. 579,180

46 Claims. (Cl. 12—10.5)

Matter enclosed in heavy brackets [ ] appears in the original patent but forms no part of this reissue specification; matter printed in italics indicates the additions made by reissue.

This invention relates to apparatus for lasting the toes of shoes.

An object of the invention is to provide an improved apparatus for toe lasting a shoe wherein the assembling of a shoe upper on a last, the pulling over of the upper at the toe of the last, and the toe lasting of the upper to wipe the lasting margin of the upper down on an insole located on the last bottom is carried out in a series of steps at a single station. Thus, the assembling of the upper on the last at one station, the pulling over of the upper and securing the upper to the last by pulling over tacks at a second station, and the toe lasting at a third station, as was heretofore practiced, is done away with. The method practiced by this apparatus is carried out by draping the upper loosely about a last having an insole placed on the last bottom. The last and upper are then supported on a toe pad adjacent a pair of horizontally movable toe embracing wipers with the insole above the bottoms of the wipers. The toe portion of the margin of the upper is pressed against the wipers by retarders, and the forepart portions of the margin of the upper is gripped by pincers. While the upper margin is so held, a toe clamp is lowered to engage the insole and a heel clamp is brought to bear against the heel of the last, after which the toe pad, toe clamp and heel clamp are lowered in unison to lower the shoe to a level where the insole is below the bottoms of the wipers. Since the upper margin is held by the retarders and pincers during the lowering of the shoe, the upper is assembled in its proper location on the last and pulled over to stretch the upper properly on the last for the wiping operation. After the shoe has been lowered, adhesive is deposited in the angle between the insole and the toe portion of the upper margin, and the wipers are moved forwardly to wipe the margin of the upper down against the insole. As the wipers move forwardly, the heel clamp is locked in position, an upward pressure is applied by the toe pad to provide overlasting pressure between the wiper bottoms and the insole, the pincers are caused to move toward each other to lay the margin of the upper down on the insole in advance of the wipers, and the retarders are raised upwardly of the wipers. At the end of the forward stroke of the wipers, the heel clamp is unlocked, increased upward bedding pressure is applied against the wiper bottoms, and the pincers are opened to release the upper margin and then returned to their original position. This completes the toe lasting of the shoe. To release the shoe, the toe pad and heel clamp are lowered, then, the wipers are retracted, the toe clamp is raised, and the heel clamp is withdrawn from the last. After this the toe pad is raised to its starting position.

A further object of this invention is to provide an improved toe lasting machine useful in carrying out the above described steps. The machine includes a frame having mounted thereon a motor driven horizontally movable wipers, motor driven retarders movable toward and away from the wipers, motor driven pincers movable toward and away from each other, relatively movable jaws on the pincers that are opened and closed by motors, and a motor driven vertically movable toe clamp. A toe pad is mounted on the vertically movable piston rod of an air operated carriage motor mounted in the base of the frame. The piston rod has a carriage connected to it to partake of its vertical movement and the carriage has a motor driven heel clamp on it movable toward and away from the heel of a last supported on the toe pad and a motor for locking the heel clamp in position.

An electro-pneumatic control circuit is provided to semi-automatically operate the machine through one cycle of operation. A three-way switch mounted on the carriage, engageable by the knee of the operator, causes the retarder motors to lower the retarders against the wipers and the pincers jaw motors to close the pincers jaws. A reactuation of this switch causes the retarders to be raised and the pincers jaws to open.

A foot operated starting switch is mounted on the machine. When the pincers and retarders have been actuated by the three-way switch to grip the margin of the upper, the momentary closing of the second switch operates the control circuit to actuate the toe clamp motor to lower the toe clamp into engagement with the insole, actuate the heel clamp motor to bring the heel clamp against the heel of the upper and release air pressure from the carriage motor to enable the toe clamp motor to push against the insole to lower the carriage to a position where the insole is below the wiper bottoms and complete the first phase of the machine cycle. A momentary reclosing of the starting switch operates the control circuit to actuate the wiper motor to advance the wipers, actuate the pincers motors to move the pincers toward each other and actuate the heel lock motor to lock the heel clamp in place. As the wipers start their forward movement, the control circuit causes the retarder motors to raise the retarders upwardly and the carriage motor to apply upward pressure by the toe pad against the last. At the end of the forward stroke of the wipers, the heel lock motor is actuated to release the heel clamp, the carriage motor is caused to apply increased upward bedding pressure, the pincers jaw motors are actuated to open the pincers jaws and the pincers driving motors are actuated to move the pincers away from each other. This completes the second phase of the machine cycle. A further momentary reclosing of the starting switch operates the control circuit to actuate the carriage motor to lower the toe pad and carriage, actuate the toe clamp motor and heel clamp motor to respectively release the pressure of the toe clamp and heel clamp against the shoe, actuate the wiper motor, toe clamp motor and heel clamp motor to respectively retract the wipers, raise the toe clamp and withdraw the heel clamp, and actuate the carriage motor to raise the toe pad and carriage to starting position.

The control circuit includes a release switch which may be closed at the end of the first phase of the machine cycle to actuate the toe clamp motors and heel clamp motors to respectively return the toe clamp and heel clamp to their initial positions and to actuate the carriage motor to raise the toe rest and carriage to their initial positions.

A further object of the invention is to provide an improved mechanism for lowering the shoe from its initial raised position with the insole above the wiper bottoms to a lowered position with the insole a predetermined distance below the wiper bottoms regardless of the thickness of the insole or the height of the last. To carry out this object, the toe clamp motor is an air operated motor comprising a cylinder fixed to the machine frame and a piston rod projecting downwardly of the cylinder to which the toe clamp is adjustably connected. When air pressure is supplied to the toe clamp motor, the piston rod and toe clamp move downwardly and push the shoe downwardly until the toe clamp motor piston bottoms against the toe clamp motor cylinder, after which the shoe stops its downward movement. This arrangement ensures that the bottom of the toe clamp, and thus the insole, is always at a given vertical position after the lowering movement of the shoe is terminated.

A further object of the invention is to provide an improved toe rest which will provide a maximum bearing surface against the vamp of the shoe upper and last regardless of the curvature of the last. To achieve this object, the toe pad is mounted for swinging movement about a horizontal axis that is transverse to the center line or line of symmetry of the wipers. Thus, when the vamp of the last is urged against the toe pad, it will rock about its axis until it reaches the point where it has a maximum of its surface bearing against the last.

A further object of the invention is to provide an improved arrangement for moving the heel clamp in the carriage and locking it in place. The heel clamp is slidably mounted in a guideway in the carriage and has a rack dependent therefrom that is in mesh with a motor driven gear segment so that rotation of the gear segment moves the rack in the guideway. A gear is connected to the gear segment to rotate therewith, and the gear is in mesh with a pinion that is freely rotatable on a shaft extending through a side wall of the carriage with the pinion on the exterior side of the wall. A motor is connected to the shaft to move the shaft inwardly of the carriage wall to thereby press the pinion against the wall, lock the pinion against rotation, and thus lock the heel clamp against movement in the guideway.

A further object of the invention is to provide means to accurately center the upper in the machine prior to starting the machine cycle. This is accomplished by providing a gauge that is adjustably positioned adjacent to and above the wipers along the line of symmetry of the wipers. The gauge is engageable with a notch located at the toe end of the upper when the upper and last are placed in the machine.

Further objects will become apparent from a reading of the following detailed description and appended claims.

Reference is now made to the accompanying drawings wherein.

Figure 1:
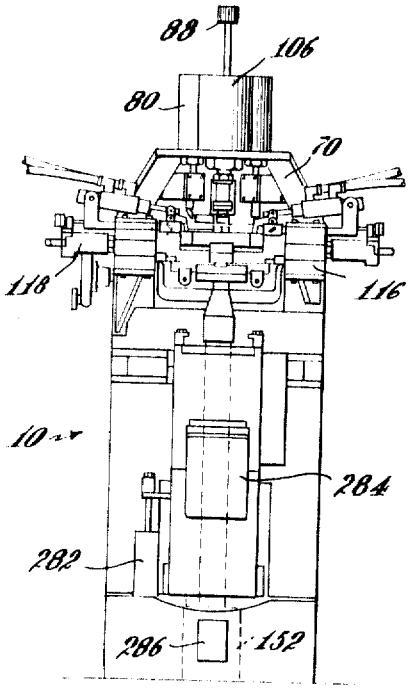
FIG. 1 is a front elevation of the machine.

Referring to FIGS. 1–5, the machine includes a frame 10 that has a vertically extending recess 12 at its forward end disposed symmetrically about the longitudinal center line of the machine. A pair of shoe end embracing wipers 14 are symmetrically disposed about the center line of the machine in a cavity 18 formed in the frame beneath a cover 16, for forward and rearward movement in the recess 12. The bottom of the cavity 18 provides support for a horizontally disposed plate 20 which is slidable a limited amount forwardly and rearwardly and which in turn supports wiper actuating cam plates 22. The cam plates have the wiper blades 14 secured to their forward ends. The cam plates 22 have the usual arcuate slots 24, which engage pins 26 fixed to the subadjacent plate 20 for controlling the movement of the cam plates and hence movement of the wiper blades to close them about the toe of a shoe. A block 28 is slidable in a slot 30 formed in the plate 20. The block 28 is connected by way of an adjustable coupling 32 at its rear end, to the piston rod 34 of an air operated motor 36. As described more fully in Patent No. 3,011,186, granted December 5, 1961, block 28 is connected by links 38 to the cam plates 22 and the coupling 32 is connected by linkage 40 to the plate 20 and the frame 10 so that forward movement of the piston rod 34 will cause a forward and inward movement of the wiper blades 14. An adjusting mechanism 42 is provided to adjust the distance between the block 28 and coupling 32 to thereby adjust the initial position of the wiper blades prior to the actuation of the motor 36. Reference may be had to the aforesaid Patent No. 3,011,186 for a more detailed disclosure of the wiper driving mechanism.

Figure 5:
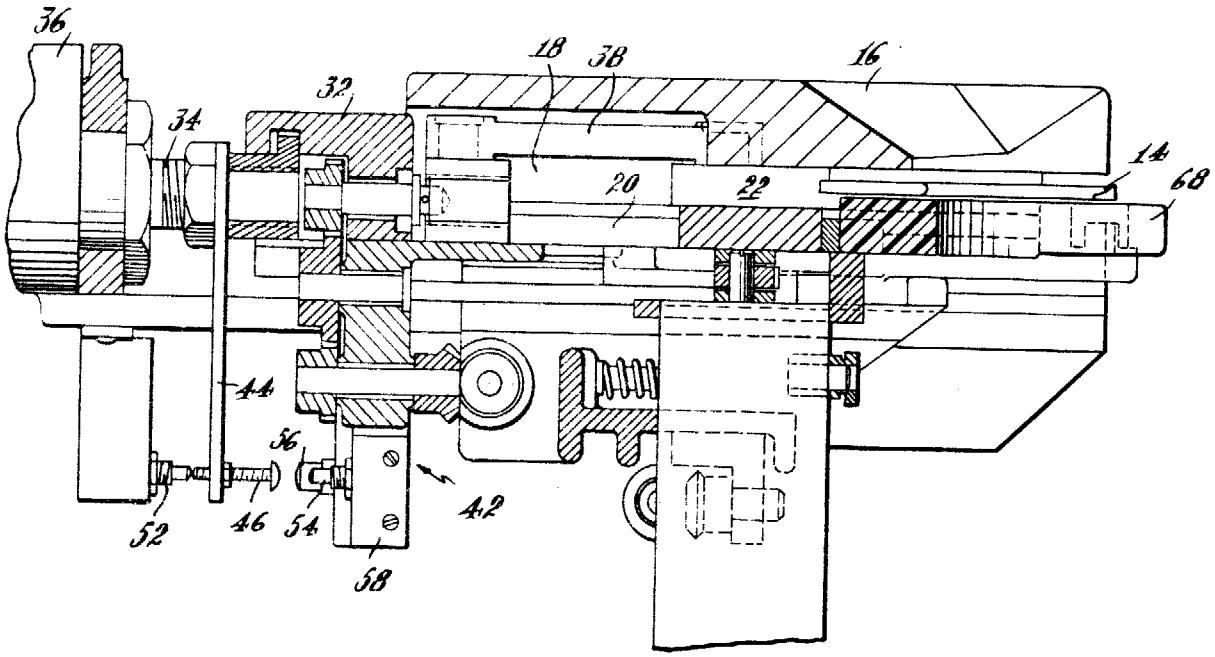
FIG. 5 is a side elevation partially in section of the wiper driving mechanism.
Figure 6:
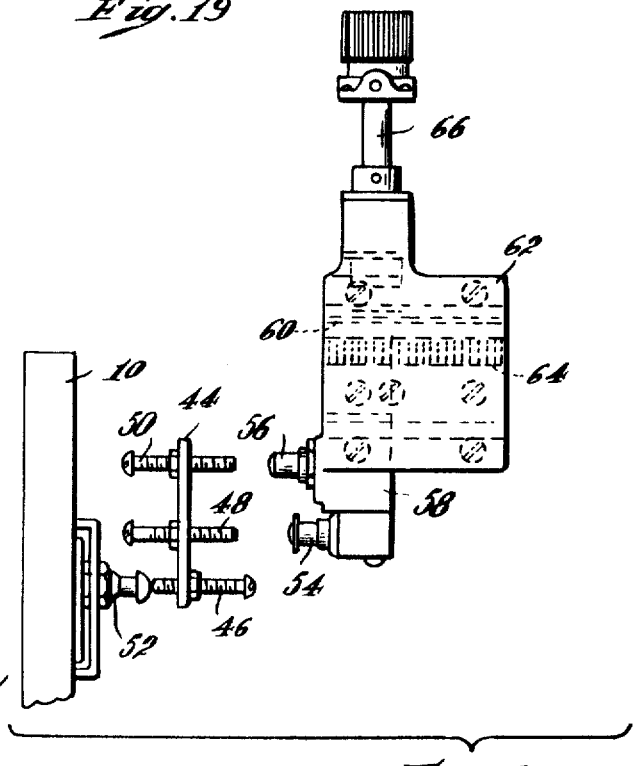
FIG. 6 is a fragmentary view of a switching mechanism.

As shown in FIGS. 5 and 6, the piston 34 has a bar 44 depending therefrom. The bar 44 has three screws 46, 48 and 50 adjustably mounted therein. The screw 46 is in alignment with a switch 52 mounted in the frame 10 and the screws 48 and 50 are respectively in alignment with a single pole double throw switch 54 and a three way switch 56 mounted in a bracket 58. The bracket 58 is slidably mounted in a guideway 60 formed in a hanger 62 that depends from the frame 10 (see FIG. 6). The bracket has a rack 64 meshing with a pinion mounted on a rod 66 that is rotatably mounted in the hanger 62. By rotating the rod 66, the position of the bracket 58 in the hanger 62 may be adjusted to thereby adjust the position of the switches 54 and 56. A lock (not shown) cooperates with the rod 66 to lock the switches in their adjusted position.

A substantially U-shaped flexible shoe conforming yoke 68 may be mounted in the frame below the wiper blades 14 for the purpose of snugly conforming a shoe upper to the shape of the last on which it is mounted prior to the lasting of the shoe as described below. The shoe conformer and its mounting may take the form described in Patent No. 3,051,969, granted September 4, 1962.

Figure 3:
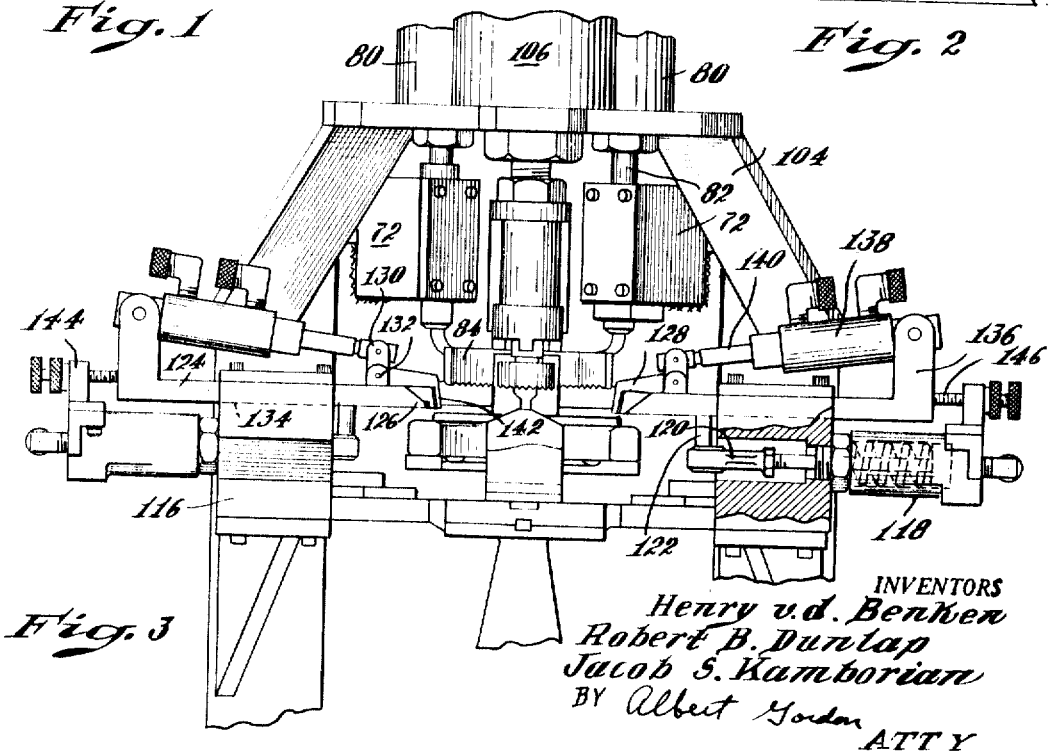
FIG. 3 is a front elevation of the upper part of the machine drawn to a larger scale.
Figure 4:
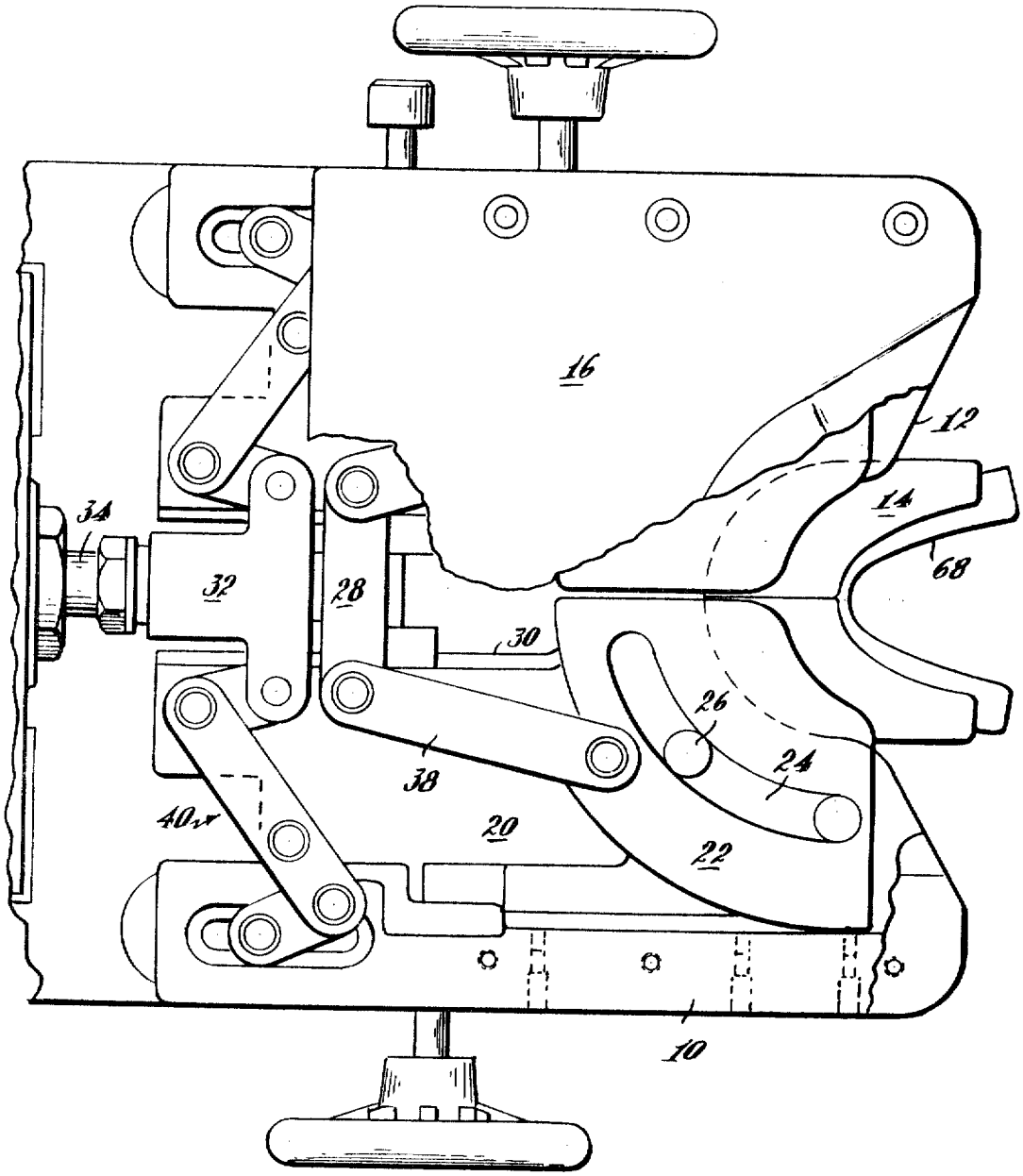
FIG. 4 is a plan view of the machine illustrating the wiper driving mechanism.
Figure 7:
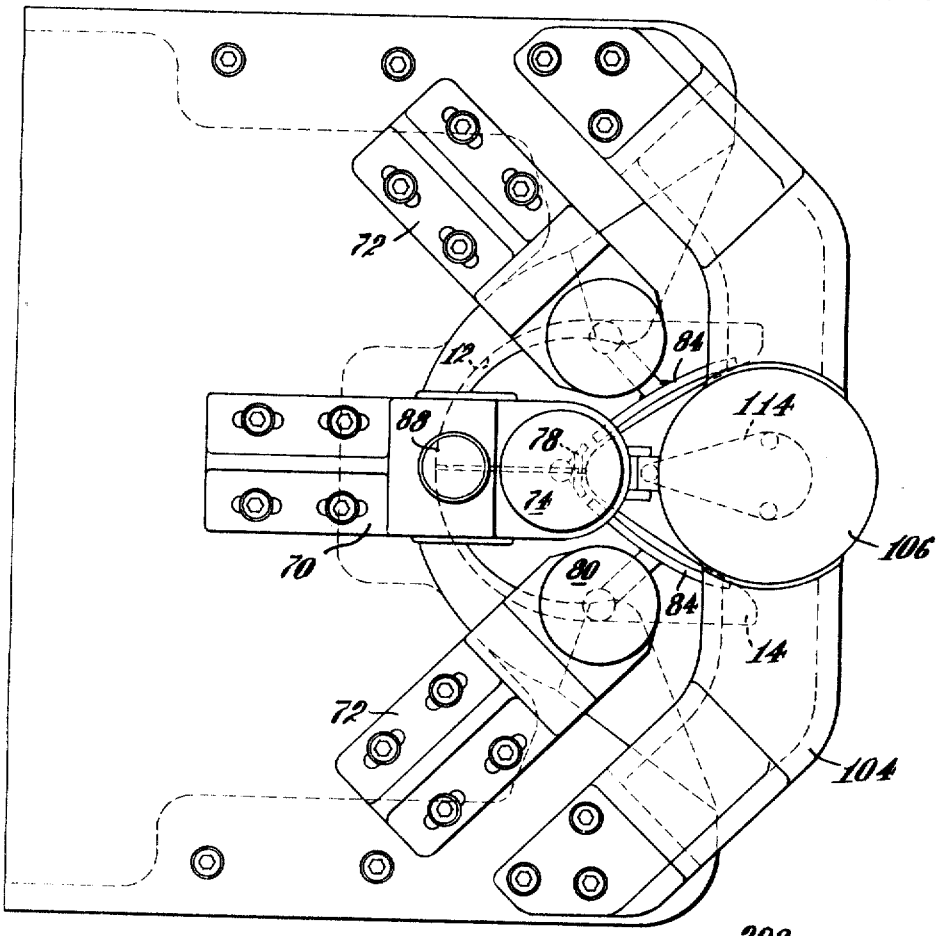
FIG. 7 is a plan view of the machine showing the retarders and toe clamps and the drive motors therefor.
Figure 8:
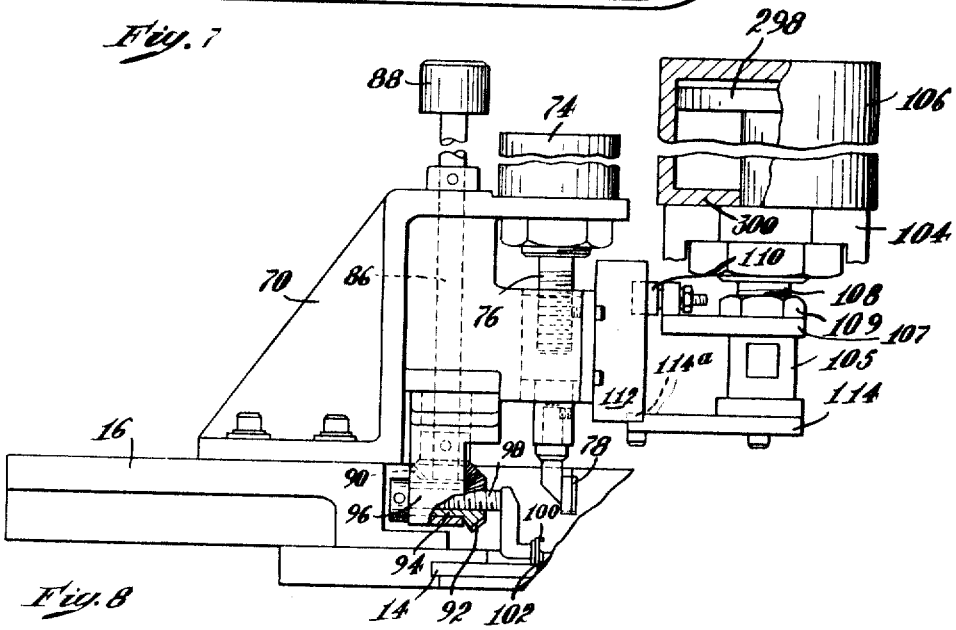
FIG. 8 is a side elevation showing the center retarder, toe clamp and upper locating gage of the machine.

As shown in FIGS. 3, 7 and 8, at the front end of the frame, a center retarder support 70 and a pair of side retarder supports 72 are mounted on the cover 16 adjacent the recess 12. The cylinder of an air operated motor 74 is mounted on the center support 70 and has a piston rod 76 depending therefrom that is slidably guided for vertical movement in a guideway formed in the center support. A center retarder blade 78 is secured to the lower end of the piston rod 76. The cylinder of an air operated motor 80 is mounted on each side support 72. Each motor 80 has a piston rod 82 depending therefrom that is slidably guided for vertical movement in its associated support 72, and each piston rod 82 has a side retarder blade 84 secured thereto at its lower end. All of the retarder blades are mounted above the wiper blades 14 so that they will engage the wiper blades when lowered. A rod 86 having a knob 88 is rotatably mounted in the center support 70. The rod 86 has a bevel gear 90 at its lower end that meshes with a bevel gear 92 that is connected to a shaft 94 to rotate therewith. The shaft 94 is rotatably mounted in a hanger 96 depending from the support 70, and the shaft 94 and the bevel gear 92 have aligned internal threads in which is threaded a rod 98. A gauge 100 is connected to and dependent from the rod 98. The gauge has a flat undersurface resting on the wiper blades 14 along their line of symmetry and a projecting triangular blade 102 that has two converging sides as shown in FIG. 14B. When the knob 88 is rotated to cause the bevel gear 92 and shaft 94 to rotate the rod 98 will move linearly since the engagement of the flat undersurface of the gauge on the wipers prevents the rod 98 from rotating with the bevel gear 92. In this manner the gauge may be linearly adjusted along the line of symmetry of the wiper blades.

Figure 9:
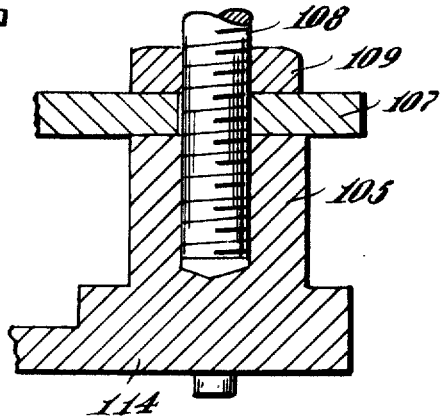
FIG. 9 is a sectional view of part of the toe clamp to an enlarged scale.

A bridge 104 is connected to the cover 16 and extends across the recess 12. The cylinder of an air operated motor 106 is connected to the bridge 104 on the longitudinal center line of the machine. The motor 106 has a threaded piston rod 108 dependent therefrom that is slidably guided by a guide pin 110 in a vertically extending guideway 112 connected to the center support 70 so that the piston rod will not rotate about its longitudinal axis during its vertical movement. A toe clamp 114 is connected to the lower end of the piston rod 108. The toe clamp has an extension 114a that is received in the guideway 112 and assists in vertically guiding the toe clamp. As seen in FIGS. 8 and 9 the piston rod is threaded into a boss 105 extending upwardly of the toe clamp 114. A plate 107, for supporting the guide pin 110 is positioned above the boss 105. The plate 107 has a smooth opening to receive the piston rod 108. A lock nut 109 serves to lock the plate 107 against the boss 105. The position of the toe clamp 114 on the piston rod 108 may be adjusted by lowering the piston rod until the guide pin 110 clears the guideway 112, loosening the lock nut 109, rotating the boss 105 on the piston rod 108 to raise or lower the toe clamp, and then retightening the lock nut. Alternatively, the lock nut may be loosened, and then the piston rod rotated by a wrench to raise or lower the toe clamp, after which the lock nut may be retightened.

Figure 2:
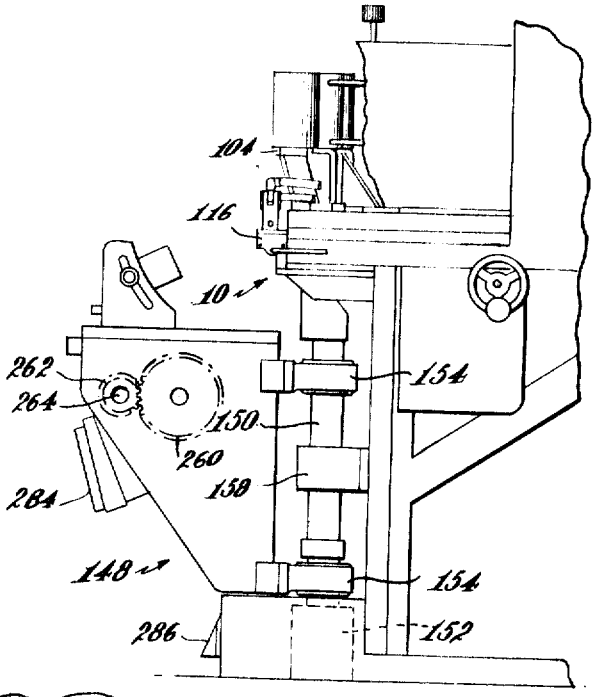
FIG. 2 is a side elevation.

As shown in FIGS. 1–3, a pair of pincer supports 116 extend forwardly of the frame 10 on opposite sides of the recess 12. A spring return air operated motor 118 is mounted exteriorly of each pincer support 116. The piston rods 120 of the motors 118 extend inwardly through the supports 116 and are connected by rods 122 to pincer slide bars 124. Each slide bar 124 has a pincer jaw 126 at its inner end. A coacting pincer jaw 128 is formed at the inner end of a bell crank lever 130 that is pivoted intermediate its ends to a lug 132 upstanding from each slide bar 124. The slide bars 124 are slidably mounted in guideways 134 in the pincer supports 116 and have legs 136 at their outer ends to which are pivoted air operated motors 138. The piston rods 140 of the motors 138 are pivoted to the bell crank levers 130 to enable the pincers 142 formed by the pincer jaws 126, 128 to be opened and closed by the movement of the piston rods 140. The pincers are vertically spaced just above the wiper blades 14 so that they may move over the wiper blades. The motors 118 have lugs 144 extending upwardly therefrom at their outer ends in which stop screws 146 are adjustably mounted to limit the outward movement of the slide bars 124.

As shown in FIGS. 1, 2, 10, 12 and 13, a carriage 148 is mounted in front of the frame 10. The carriage 148 is rigidly connected to the piston rod 150 of an air operated motor 152 mounted in the frame 10. The carriage has a pair of vertically spaced brackets 154 that embrace the piston rod 150. The upper bracket 154 is located between a pair of collars 156 secured to the piston rod 150 so that carriage partakes of the vertical movement of the piston rod. A guide sleeve 158 connected to the frame 10 embraces the piston rod 150 and guides it in its vertical travel.

Figure 11:
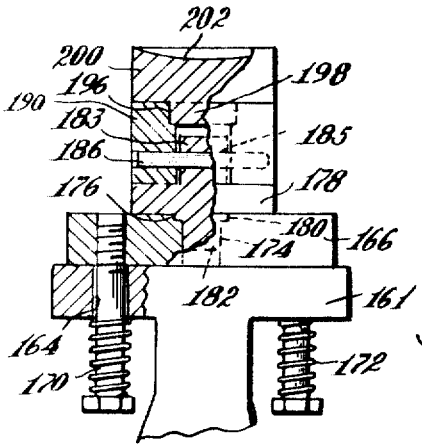
FIG. 11 is a view, partially in section, taken along the line 11—11 of FIG. 10.
Figure 10:
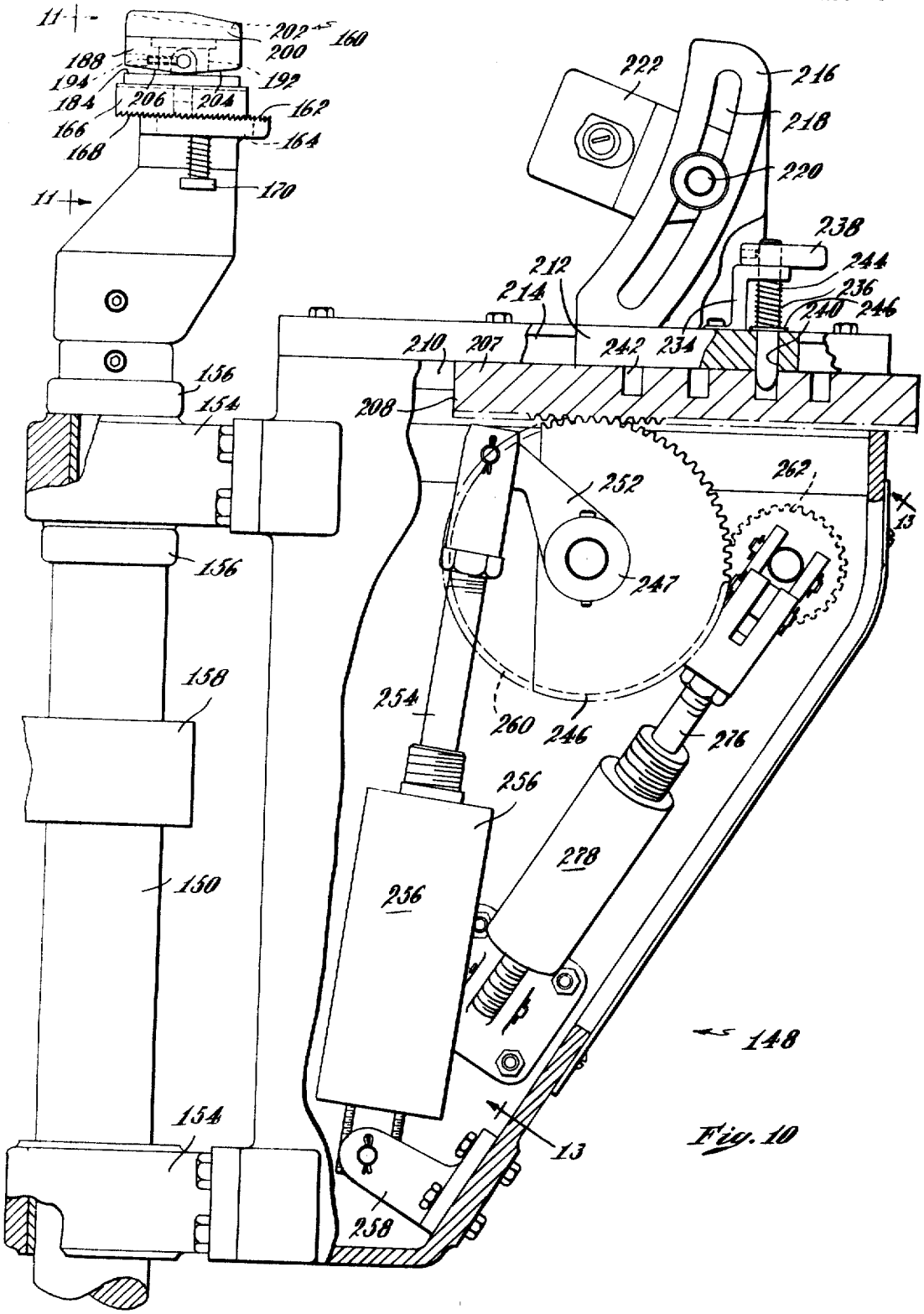
FIG. 10 is a side elevation to an enlarged scale of the shoe supporting means.
Figure 13:
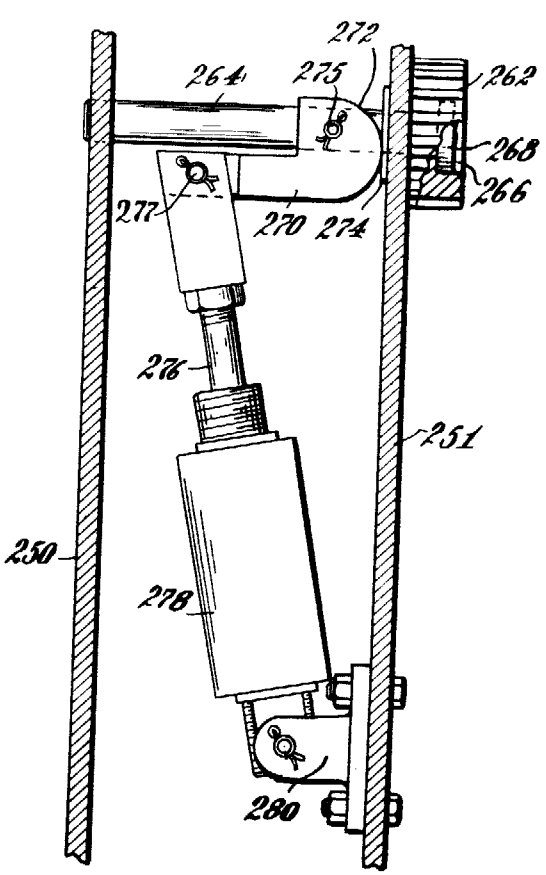
FIG. 13 is a view taken along the line 13—13 of FIG. 10.

A toe rest 160 is fitted to the top of the piston rod 150. As shown in FIGS. 10 and 11, the top of the piston rod 150 is formed into a toe rest plate 161 having teeth 162 on its upper surface and a pair of elongated slots 164 running lengthwise thereof. A toe rest plate 166 is positioned above the plate 161 and has teeth 168 thereon adapted to mesh with the teeth 162. A threaded stud 170 extends through each slot 164 and is threaded into the plate 166. A compression spring 172 is coiled about each stud 170 and extends between a head on the lower end of each stud and the plate 161. The plate 166 has a hole 174 intersecting a longitudinal mortise 176 in the upper surface of the plate 166. A clevis block 178 has a tenon 180 that is seated in the mortise 176 and a stem 182 that is received in the hole 174. The block 178 has a clevis 183 projecting upwardly of its flat top surface 184. The clevis has a hole 185 in which a pin 186 is rotatably mounted. A pad block 188 has legs 190, on opposite sides of a cavity 192, straddling the clevis 183. The pin 186 is received in holes in the legs 190 and is locked to the pad block by a set screw 194 threaded into the block 188 and bearing against the pin 186. The pad block 188 has a mortise 196 that receives a tenon 198 on a pad 200. The pad, which is preferably made of a resilient material such as rubber, leather or felt, has a concave sloping upper surface 202 adapted to receive the vamp portion of a shoe upper mounted on a last, as described below. The pad block 188 has upwardly sloping bottom surfaces 204 and 206 that meet below the pin 186 so that the block 188 and pad 200 may rock about the axis of the pin 186 until either the surface 204 or the surface 206 contacts the clevis block surface 184. The toe rest 160 may be longitudinally adjusted by pulling it upwardly against the springs 172 to disengage the teeth 162, 168, moving it to the desired position with the studs 170 sliding in the slots 164, and then releasing it to allow the springs 172 to cause the re-engagement of the teeth 162 and 168.

Figure 12:
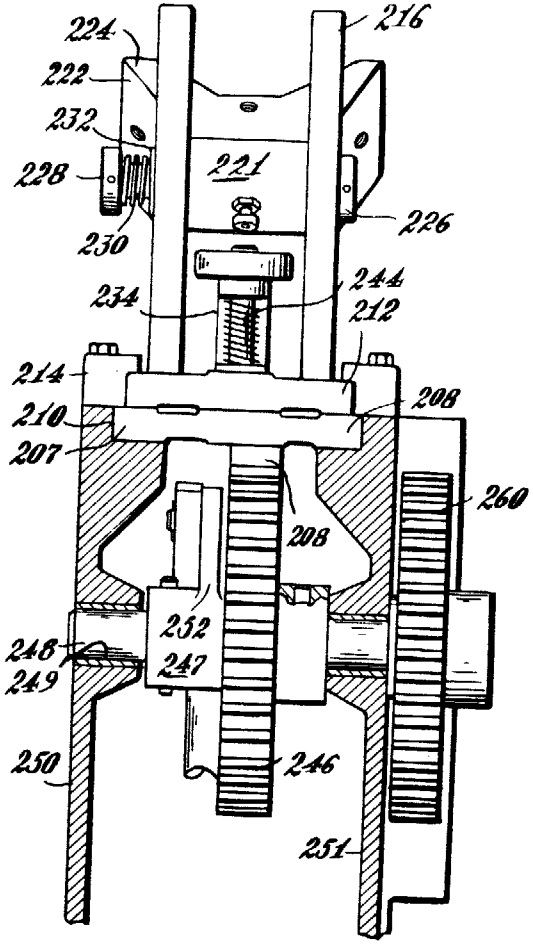
FIG. 12 is an elevation partly in section of the carriage.

A plate 297 carrying a rack 208 is slidably mounted in a guideway 210 formed at the top of the carriage 148 (see FIGS. 10 and 12). A heel clamp carrier 212 is slidably mounted on the plate 207 in gibs 214 mounted on top of the carriage 148. The carrier 212 has a pair of spaced uprights 216 attached thereto. The carriers have aligned arcuate slots 218 that receive a pin 220. The portion of the pin between the uprights 216 is received in the base 221 of a forked heel clamp 222, the heel clamp having a pair of divergent legs 224. A collar 226 is located at one end of the pin 220 exteriorly of one of the uprights 216. The other end of the pin 220 has a knurled knob 228 thereon, and a compression spring 230 is coiled about the pin 220 and extends between the knob 228 and a washer 232 bearing against the other upright 216. The spring 230 serves to urge the pin 220 and collar 226 leftwardly (FIG. 12) and thereby lock the heel clamp 222 in place by forcing the collar 226 and clamp base 221 towards each other to grip the opposite sides of the right upright 216 (FIG. 12). Should it be found desirable to relocate the clamp 222 in the uprights 216, the pin 220 is pushed rightwardly (FIG. 12) against the force of the spring 230, the pin is moved to a new position in the slots 218 to relocate the clamp 222, and the pin 220 is released to allow the spring 230 to urge the collar 226 against the contiguous upright 216 to lock the clamp in the new position.

The carrier 212 has a bracket 234 extending upwardly therefrom. An elongate pin 236 is slidably mounted in the bracket 234 and has a handle 238 attached thereto above the bracket 234. The pin 236 extends through a hole 240 in the carrier 212 and into one of a plurality of holes 242 in the plate 207. A compression spring 244 coiled about the pin 236 and interposed between the bracket 234 and a collar 246 fixed to the pin resiliently urges the pin downwardly into one of the holes 242 to lock the heel clamp carrier 212 to the plate 207. The position of the heel clamp carrier 212 and of the heel clamp 222 on the rack 208 may be adjusted by lifting the handle 238 to raise the pin 236 out of the hole 242 in which it is received, moving the carrier along the guideway formed by the gibs 214 and lowering the pin 236 into another of the holes 242.

A gear segment 246 is mounted on a sleeve 247 that is rigidly connected to a shaft 248. The shaft 248 is rotatably mounted in bearings 249 located in the side walls 250 and 251 of the carriage 148. A link 252 extending radially from the sleeve 247 is pivotally connected to the piston rod 254 of an air operated motor 256, the motor 256 being pivotally connected to a bracket 258 that is fixed to the carriage 148. A gear 260 located exteriorly of the side wall 251 is fixed to the shaft 248 to rotate therewith. The gear 260 is in mesh with a pinion 262 that is rotatably mounted on a shaft 264 slidably mounted in the walls 250 and 251. The pinion 262 has a socket 266 in its outwardly facing wall, and the shaft 264 has an enlarged head 268 seated in the socket. A link 270, having an eccentric cam surface 272, is pivotally connected to the shaft 264 by a pivot 275 at a point intermediate the walls 250 and 251. The cam surface 272 bears against a disc 274 fixed to the interior of the wall 251 that is opposite the pinion 262. The link 270 is pivotally connected by a pivot 277 to the piston rod 276 of an air operated motor 278 which in turn is pivotally connected to a bracket 280 fixed to the wall 251. With the motor 278 in the position shown in FIG. 13, there is enough play between the head 268 and the pinion 262 to allow the pinion to rotate about the shaft 264, so that when the motor 256 is actuated to move the piston rod 254 downwardly the gear segment 246 will rotate about the axis of the shaft 248 and mesh with the rack 208 to cause the plate 207 and the clamp 222 to move to the left (FIG. 10) towards the toe rest 160. During this movement the gear 260 will rotate with the shaft 248 and the pinion 262 will idle about the shaft 264. When the motor 278 is actuated to move the piston rod 276 downwardly the links 270 will swing counterclockwise (FIG. 13) about the pivot 275 to bring the larger radius portion of the cam surface 272 against the disc 274 and thus move the pivot 275 and the shaft 264 leftwardly. This will have the effect of moving the head 268 leftwardly to lock the pinion 262 against the wall 251. The locking of the pinion 262 against motion will lock the gear 260, gear segment 246 and rack 208 against motion and therefore lock the heel clamp 222.

A shock absorber 282 extends from the carriage 148 to the base 10, a three-way switch 284 adapted to be operated by the knee of the operator is mounted on the carriage 148, and a switch 286 adapted to be operated by the foot of the operator is mounted on the frame 10 (see FIGS. 1 and 2).

Referring to FIGS. 14–17, the shoe to be assembled, pulled over and toe lasted is mounted on a last 288. An insole 290 is placed on the last bottom with the last held bottom-up. The insole may be secured to the last bottom by tacks or may rest loosely thereon. A shoe upper 292 is draped loosely about the last with the margin of the upper extending above the insole an amount sufficient to enable the to be described operations to be performed efficiently. At this time, the retarder blades 78 and 84 are raised upwardly of the wiper blades 14, the toe clamp 114 is in its upper non-clamping position, the heel clamp 222 is in its retracted position, the wipers 14 are in their retracted position, and the pincers 142 are in their outer positions with their jaws open. The shoe is placed on the toe pad which is so located vertically that the upwardly facing surface of the insole is approximately level or somewhat above the upper surfaces of the wipers 14. The lasting margin 294 of the upper at its toe end is placed on top of the wipers 14 with a notch 296 at the forward end of the lasting margin in engagement with the gage blade 102 to center the upper properly in the machine. If necessary, the knob 88 is rotated to adjust the position of the gauge 100 so that it will be properly located for the size shoe that is to be lasted. The margin of the upper on both sides of the last at about the forepart of the upper is placed between the jaws of the pincers 142. The retarders 78 and 84 are now moved downwardly to press the lasting margin 294 against the wiper blades 14. At the same time, the jaws of the pincers 142 are closed to grip the foreparts of the upper margins. If the shoe has not been properly positioned in the machine, and is not properly gripped by the retarders and pincers, the retarders may be raised and the pincer jaws opened, and the operator may start anew.

Figure 14A:
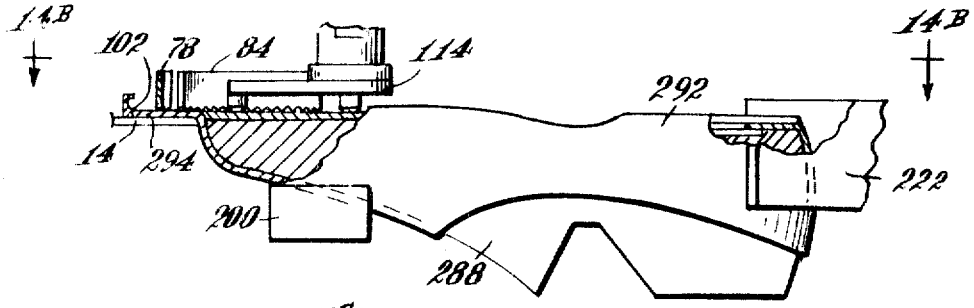
FIG. 14A is an elevation showing the shoe and last at the beginning of the machine cycle.
Figure 14B:
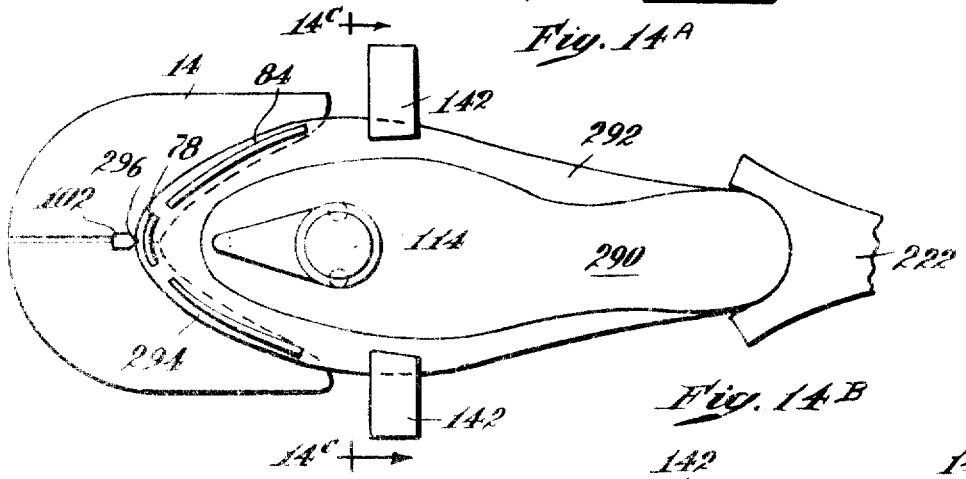
FIG. 14B is a view taken along the line 14B—14B of FIG. 14A.
Figure 14C:
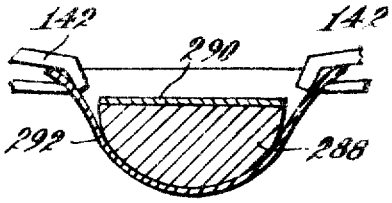
FIG. 14C is a view taken along the line 14C—14C of FIG. 14B.

When the operator is satisfied that the lasting margin is properly gripped by the retarders and side pincers, the heel clamp 222 is brought against the heel end of the last and the toe clamp 114 is brought downwardly against the insole 290 so that the parts assume the position shown in FIGS. 14A, 14B, and 14C. The toe clamp is caused by the motor 160 to continue its downward movement and push the shoe downwardly until the piston 298 bottoms against the bottom wall 300 of the cylinder of the motor 106 (see FIG. 8). The abutting walls of the piston 298 and cylinder 300 thus act as a limit-stop to limit the extent of downward movement of the piston 108. The toe clamp 114 has been mounted on the piston rod 108 so that when this bottoming takes place the bottom of the toe clamp is located below the bottoms of the wipers 14 by an amount that is substantially equal to the thickness of the lasting margin 294. Therefore, the shoe is lowered until the upwardly facing surface of the insole 290 is located below the bottoms of the wipers by the aforesaid amount regardless of the thickness of the insole or the heightwise dimension of the last to the position shown in FIGS. 15A and 15B. When the toe clamp 114 engages the insole 290, the toe pad 200 will rock about the axis of the pin 186 until there is a maximum bearing of the toe pad surface 202 against the curved surface of the vamp and the last against which it bears. The rockable support of the toe pad thus assures a maximum gripping action on the shoe by the toe clamp and toe pad which act as the jaws of a vise.

During the aforesaid lowering of the shoe the margin of the upper is gripped by the retarders and side pincers to draft and stretch the upper about the last. The upper slips to some extent from beneath the retarder blades and the pincer jaws, but only after it has been pulled over the last and cannot be further stretched. Due to the location of the retarder jaws 78 and 84 forwardly of the toe of the last, they will also tend to exert a heel to toe pull on the last and dispose the heel of the upper snugly about the heel of the last. This action by the retarders and side pincers while the shoe is lowered eliminates the need for a separate assembling and pulling over operation prior to toe lasting the shoe. During the downward movement of the shoe, the aforementioned shoe conformer yoke 68 will snugly conform the upper to the shape of the last substantially in the manner described in the aforementioned Patent No. 3,051,969. At this time, if the shoe has not properly assembled and pulled over on the last, the parts may be returned to their initial positions and the operation started anew.

Figure 15A:
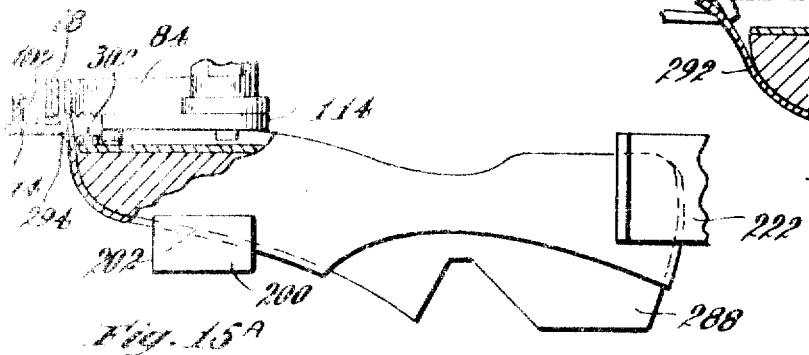
FIG. 15A is an elevation of the shoe as it appears partway through the machine cycle.
Figure 15B:
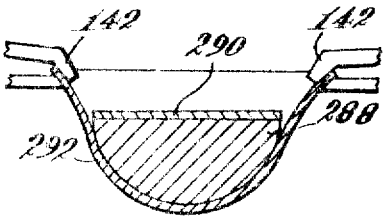
FIG. 15B is a view similar to FIG. 14C but showing the shoe in the FIG. 15A position.

Adhesive 302 is now deposited in the angle between the upwardly extending lasting margin 294 and the insole 290 as indicated in FIGURE 15A to enable the lasting margin and insole to be bonded to each other during the subsequently performed lasting operation. The adhesive may be deposited in conformance with the method described in Patent No. 2,969,555 with the adhesive applying apparatus described in [pending application Serial No. 68,546 filed November 10, 1960] *Patent Number 3,169,078*. It is within the purview of the invention, however, to attach the lasted upper to the insole by other arrangements, as for example, by using precemented shoe uppers or by attaching the lasting margin to the insole by tacks or staples after the below described wiping operation.

Figure 16A:
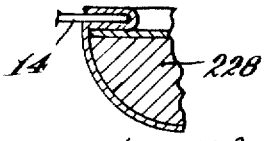
FIG. 16A is a side elevation in section of the toe of the shoe partway through the lasting operation.
Figure 16C:
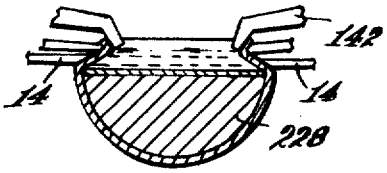
FIG. 16C is a view taken along the line 16C—16C of FIG. 16B.
Figure 16B:
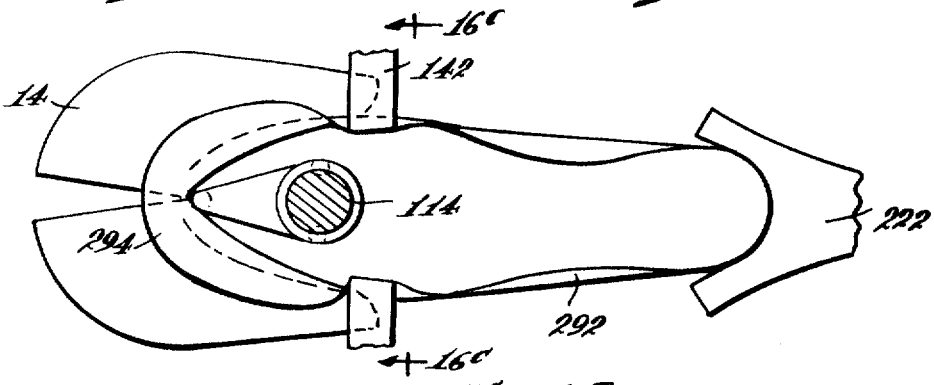
FIG. 16B is a plan view of the shoe corresponding to the stage shown in FIG. 16A.
Figure 17A:
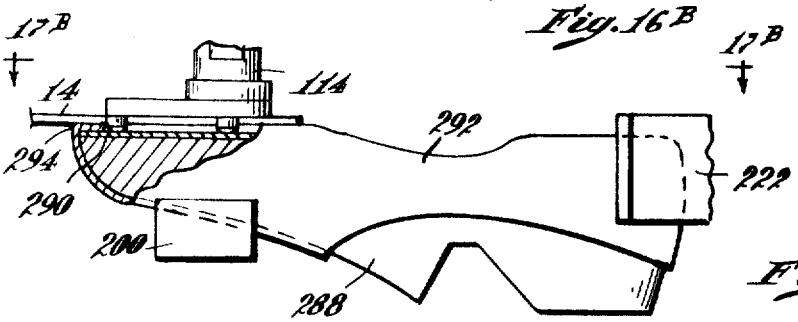
FIG. 17A is an elevation showing the shoe at the completion of the lasting operation.
Figure 17B:
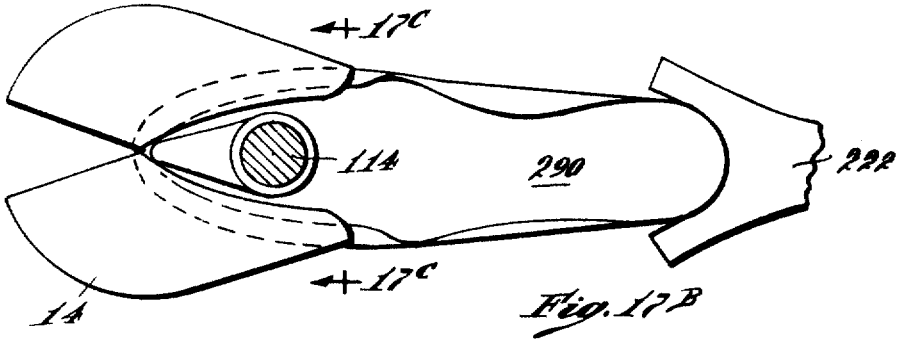
FIG. 17B is a view taken along the line 17B—17B of FIG. 17A.
Figure 17C:
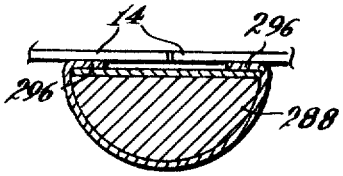
FIG. 17C is a view taken along the line 17C—17C of FIG. 17B.

The wipers 14 are now moved forwardly and toward each other in the conventional manner to wipe or fold the lasting margin 294 down against the insole 290 at the toe of the shoe. Concurrently with the initiation of the forward movement of the wipers, the heel clamp 222 is locked to firmly hold the last in place during the wiping operation. At the same time as the wipers move forwardly, the side pincers 142 start moving inwardly toward each other. The pincer movement causes the upper margin at the forepart of the shoe to be layed in over the insole, as illustrated in FIGS. 16A, 16B and 16C so that the lasting margin wiped down on the insole by the wipers is of substantially uniform width. As the wipers start their forward movement, the retarders 78 and 84 are elevated to release their grip on the lasting margin and upward pressure is applied by the toe pad 20 to provide an overlasting pressure between the insole and the wiper bottoms. During the forward and inward movement of the wipers and the inward movement of the pincers, the upper margin, after being stretched to its utmost slips between the pincer jaws. This arrangement provides for a uniform pull on the margin along both sides of the shoe during the wiping operation.

When the wipers have completed their forward stroke, the pincer jaws 126, 128 are opened to release the upper margin and the pincers 142 move outwardly to their original position, the heel clamp 222 is unlocked, and increased upward pressure is applied by the toe pad 200 against the last to apply bedding pressure between the wiper blades 14 and the [last] *lasting* margin of the upper and the insole to iron down the lasted margin. At this point the parts assume the position shown in FIGS. 17A, 17B and 17C.

After the bedding pressure has been applied for a sufficient length of time, the carriage 148 together with the toe pad 200 and heel clamp 222 is lowered to lower the shoe from the wipers 14, the wipers are retracted, the heel clamp 222 is retracted, toe clamp 114 is raised to starting position and the carriage is raised to elevate the toe pad and heel clamp to the starting position. The operator may remove the shoe from the machine after the raising of the toe clamp and prior to the raising of the carriage.

Figure 18:
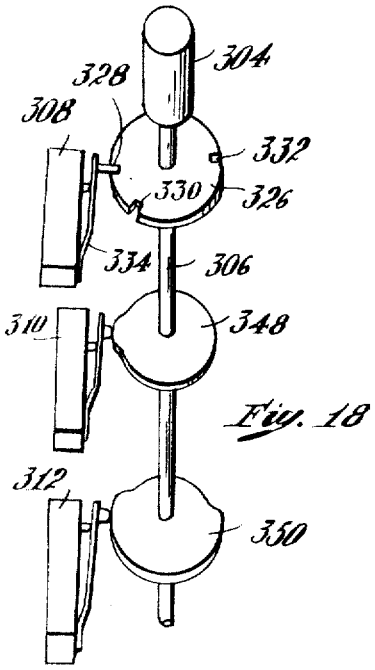
FIG. 18 is a diagrammatic view of the motor driven cams for actuating the switches that control the cycle of the machine.
Figure 19:
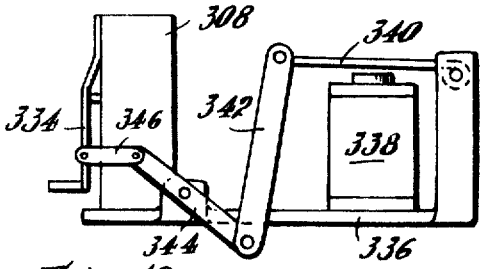
FIG. 19 is a view of a switch actuating relay.
Figure 20:
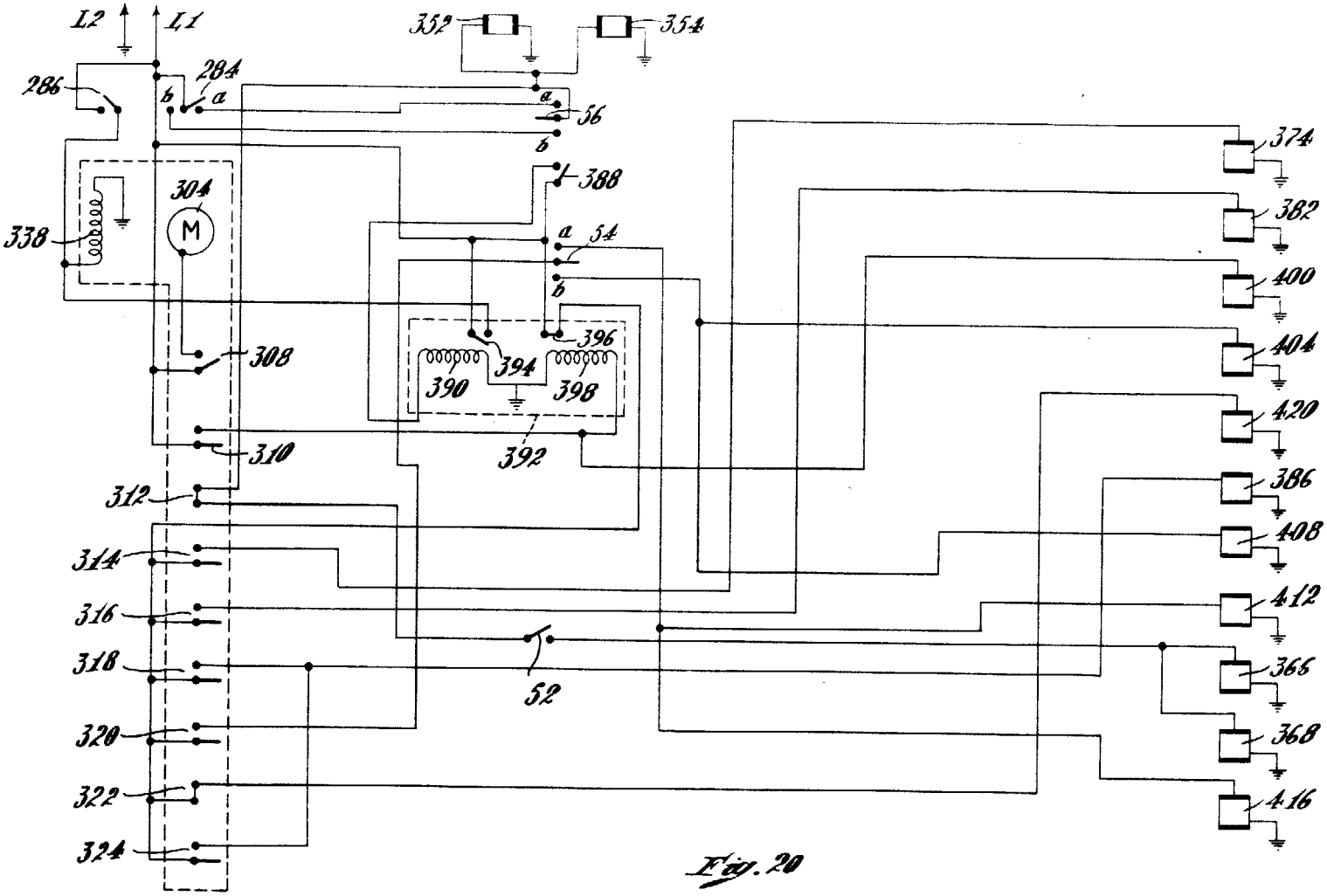
FIG. 20 is a wiring diagram of the electric control for the machine.
Figure 21:
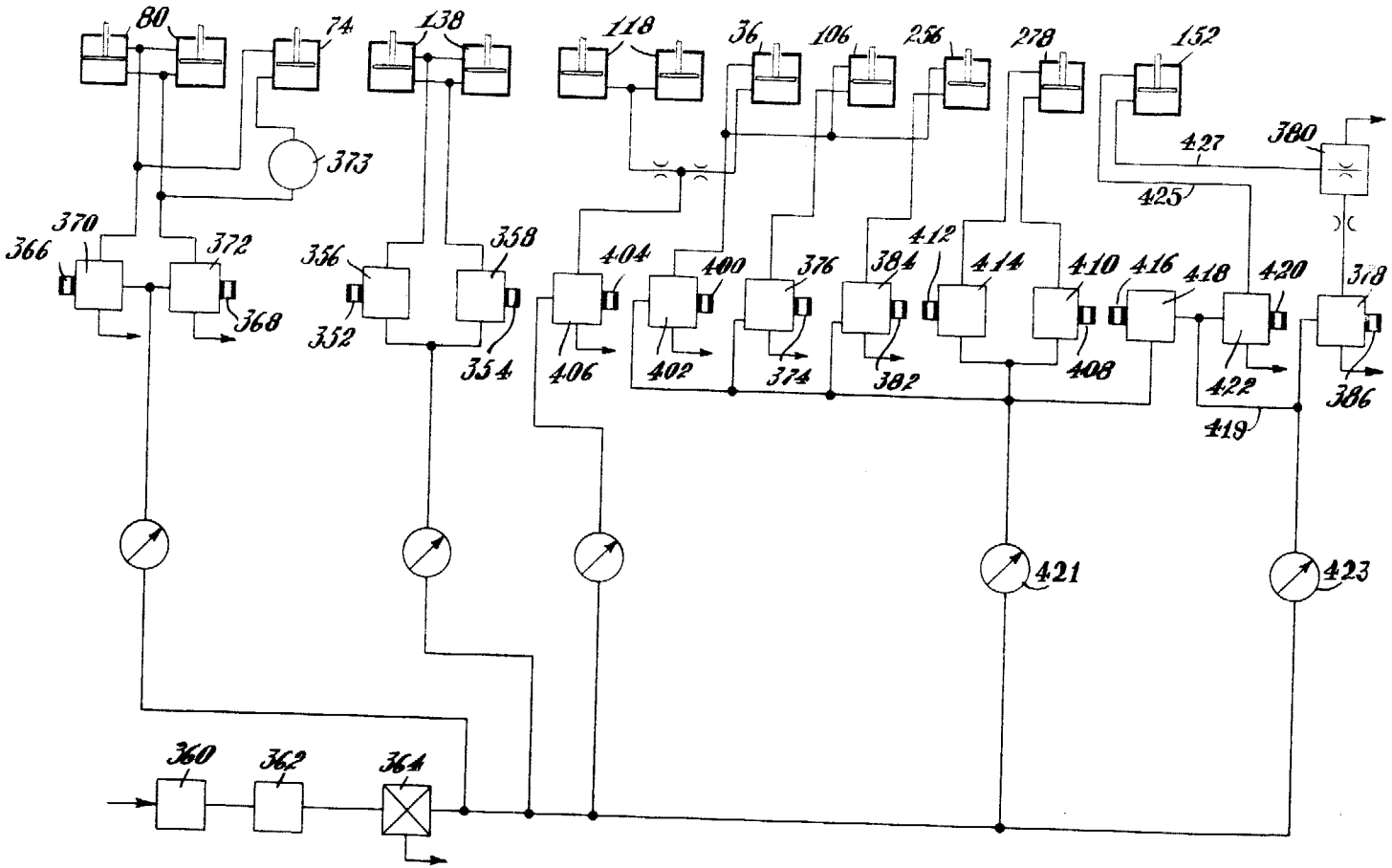
FIG. 21 is an air pressure diagram of the pneumatic controls for operating the air operated motors in the machine.

The electric circuit illustrated in FIG. 20 and the air pressure circuit illustrated in FIG. 21 are utilized to cause the machine to operate in the manner described above. The electric control circuit includes a motor 304 which rotates a cam shaft 306 (see FIG. 18) through one revolution. Nine switches 308, 310, 312, 314, 316, 318, 320, 322 and 324 are located alongside the cam shaft, switches 308, 310 and 312 being shown in FIG. 18. A control disc 326 is keyed to the shaft 306 alongside the switch 308. The disc 326 has three notches 328, 330 and 332 in its periphery. The notches 328 and 330 are approximately 30 degrees apart, the notches 330 and 332 are approximately 150 degrees apart and the notches 332 and 328 are approximately 180 degrees apart. The switch 308 has a switch blade 334 that it biased outwardly of the switch to ride on the periphery of the disc 326. When the switch blade 334 is in engagement with one of the notches, the switch 308 is open, and when the switch blade rides on the periphery of the disc 326 between the notches the switch is closed. The switch 308 is supported on a base 336 (FIG. 19) which also supports a solenoid 338. An armature 340 is pivoted to the base 336 at one end and is pivoted to a link 342 at its opposite end. The link 342 is pivotally connected to one end of a link 344 that is pivoted at its midpoint to the base and is pivotally connected at its other end to a link 346 which in turn is connected to the switch blade 334. Through this linkage, when the armature 340 is attracted to the solenoid 338, due to the energization of the solenoid, the switch blade 334 is pulled toward the switch to ride out of one of the notches 328, 330 or 332 and close the switch 308. A switch controlling cam is keyed to the shaft 306 opposite each of the switches 310, 312, 314, 316, 318, 320, 322 and 324, the cam 348 for the switch 310 and the cam 350 for the switch 312 being shown in FIG. 18. The cams have cam lobes and cam depressions of the switches 310, 312, 314, 316, 318, 320, 322 and 324 bear against. When a switch blade bears against a cam lobe the associated switch is closed, and when a switch blade bears against a cam depression, the associated switch is open.

At the start of a cycle of operation the wipers 14 are retracted with the result that the screw 46 (FIGURE 6) maintains switch 52 closed. The switch 54 engages its terminal b (FIGURE 20) and the switch 56 engages one or the other of its terminals a or b.

The operator starts the machine cycle by supporting the shoe on the toe pad 200 and placing the lasting margin of the upper on the wipers and the upper margin at the forepart between the open jaws of the pincers 142 as described above. He now actuates the above referred to three-way switch 284 by hitting it with his knee which will cause the switch to move to either terminal a or terminal b. The electric circuit is constructed, as described below, so that if the switch 284 moves to terminal a it will be connected to the three-way switch 56 through its terminal a, and if the switch 284 moves to terminal b it will be connected to the three-way switch 56 through its terminal b. The actuation of the switch 284 in the appropriate direction causes current to flow from a source of power labelled L1, L2 through the switch 56 to solenoids 352 and 354. The energization of solenoid 352 closes a normally open valve 356, and the energization of solenoid 354 opens a normally closed valve 358 (see FIG. 21). The opening of valve 358 causes air to flow from a source of air pressure through an air filter 360, an air lubricator 362, a three-way valve 364, and the valve 358 to the motors 138 to extend the piston rods 140 and close the pincer jaws on the upper margin. The actuation of the switch 284 also causes current to flow through the switch 56, the normally closed switch 312, and the now closed aforementioned switch 52 to solenoids 366 and 368. The energization of the solenoid 366 closes a normally open valve 370 and the energization of the solenoid 368 opens a normally closed valve 372 to thereby admit air into the motors 74 and 80 to cause the retarders 78 and 84 to be lowered to clamp the lasting margin 294 against the wipers 14. A pressure regulator 373 causes the center retarder 78 to apply less pressure on the lasting margin than the side retarders 84, which is desirable when the shoe is lowered to effect the pulling over and assembling operation. At this point, if the shoe is not properly positioned in the machine and the upper margin is not properly gripped by the pincers and retarders, the operator may again actuate the three-way switch 284 to open the pincer jaws and raise the retarders, and start anew.

The operator now applies pressure for a short time with his foot on the aforementioned switch 286 to close it momentarily. The closing of the switch 286 energizes the solenoid 338 to close the switch 308 and pull the switch blade 334 out of the notch 328 of the disc 326. The closing of the switch 308 turns on the motor 304 to rotate the cam shaft 306 and the disc and cams keyed thereto. As soon as the notch 328 has passed the switch blade 334, the switch blade engages the periphery of the disc 326 and thus remains closed to keep the motor 304 on despite the deenergization of the solenoid 338 until the notch 330 is presented to the switch blade.

After the cam shaft has commenced its rotation, the switch 314 is closed to energize a solenoid 374 which opens a normally closed three-way valve 376 to operate the motor 106 to lower the toe clamp 114 and bring it to bear against the insole 290. At this time air pressure is passing through a normally open three-way valve 378 and a quick exhaust valve 380 to the motor 152 to maintain the piston rod 150, the carriage 148 and the toe pad 200 in a raised position. The upward force exerted by the toe pad 200 is greater than the downward force exerted by the toe clamp 114, so the toe clamp stops its downward movement when it engages the insole to clamp the shoe between the toe clamp and toe pad.

The switch 316 is now closed to energize a solenoid 382 to open a normally closed valve 384 to apply air pressure to the motor 256 in a direction to bring the heel clamp 222 against the heel end of the shoe.

The switch 318 is now closed to energize a solenoid 386 to close the normally open three-way valve 378 to allow the air beneath the piston of the motor 152 to be exhausted through the valve 380. This allows the toe clamp motor 106 to push the shoe and the carriage 148 downwardly until the piston 298 of the motor 106 bottoms on the cylinder wall 300. At this time the carriage 148 stops its downward movement due to the resistance to downward movement of the carriage caused by the frictional forces in the motor 152, the up-pull exerted by the retarders 78 and 84 and the pincers 142 on the margin of the shoe upper, the pressure of the shoe conforming yoke 68 on the last, and the resistance to downward movement of the shock absorber 282. As stated above, the distance between the cylinder wall 300 and the bottom of the toe clamp 114 is so set that when the carriage 148 stops its downward movement, the upwardly facing surface of the shoe insole is always spaced below the undersurface of the wipers an amount substantially equal to the thickness of the lasting margin regardless of the thickness of the insole and the heightwise dimension of the last.

The control disc 326 now reaches the point where the switch blade 334 engages the notch 330 to open the switch 308 and shut off the motor 304.

At this time the operator may inspect the shoe to see if the foregoing operation has properly assembled and pulled over the shoe on the last. If the shoe has not been assembled and pulled over to the operator's satisfaction, he may close a manually operable switch 388 to energize the latch coil 390 of a latch relay 392. The latch relay 392 is a commercial unit having a normally open switch 394, a normally closed switch 396, the aforesaid latch coil 390, and a release coil 398. The energization of the latch coil 390 causes the switch 394 to close and the switch 396 to open. The opening of the switch 396 opens the circuit between the source of power and the switches 314, 316, 318, 320 and 324 to, in effect, open these switches. The opening of the switch 314 deenergizes the solenoid 374 to close the valve 376 to thereby vent the pressure side of the toe clamp motor 36 so that the toe clamp no longer exerts a downward pressure on the shoe. The opening of the switch 316 deenergizes the solenoid 382 to close the valve 384 and vent the pressure side of the motor 256 to release the pressure of the heel clamp 222 on the shoe. The opening of the switch 318 deenergizes the solenoid 386 to open the valve 378 to apply air pressure to the motor 152 to raise the carriage 148, the toe pad 200, the shoe and the toe clamp 114. The closing of the switch 394 of the relay 392 energizes the solenoid 338 to thereby withdraw the switch blade 334 from the notch 330 and close the switch 308. The closing of the switch 308 turns the motor 304 on to rotate the cam shaft 306 until shortly before the notch 328 appears opposite the switch blade 334, at which time a lobe on the cam 348 will momentarily close the switch 310. The closing of the switch 310 energizes the release coil 398 of the latch relay 392 to close the switch 396 and open the switch 394 thereby reconnecting the switches 314, 316, 318, 320, 322 and 324 to the source of power and opening the circuit to the solenoid 338 to turn off the motor 304 and stop the cam shaft 306 with the switch blade 334 in the notch 328. The closing of the switch 310 also energizes a solenoid 400 to open a normally closed valve 402 to thereby supply air pressure to the motor 106 to raise the toe clamps 114 to starting position and to supply air pressure to the motor 256 to withdraw the heel clamp 222 to starting position. The operator may now open the switch 388 and start the machine cycle anew, and if he desires, kick the three-way switch 284 as described above to release the retarders and pincers and relocate the shoe in the machine. When the cam shaft starts to rotate in a new cycle of operation, the cam 348 immediately opens the switch 310 to deenergize the solenoid 400 and close the valve 402 so that the air pressure no longer forces the toe clamp 114 to its upper position or the heel clamp 222 to its retracted position.

After the machine has stopped with the notch 330 engaged by the switch blade 334, and the adhesive 302 has been applied to the shoe, the operator again steps momentarily on the switch 286 to cause the motor driven cam shaft 306 to resume its rotation. The switch 320 is now closed to allow current to flow through the terminal b of the aforementioned switch 54 to energize a solenoid 404 to open a normally closed three-way valve 406. The opening of the valve 406 allows air pressure to actuate the motors 118 to move the pincers 142 toward each other and actuates the motor 36 to advance the wipers 14. The closing of the switch 320 also energizes a solenoid 408 to open a normally closed valve 410 which causes the motor 278 to be actuated to lock the heel clamp 222 in place. As the wipers commence their forward movement, the forward movement of the bar 44 causes the screw 46 to leave the switch 52 thereby opening the switch 52 to deenergize the solenoids 366 and 368 to open the valve 370 and close the valve 372 and thereby actuate the motors 74 and 80 to raise the retarders 78 and 84 and release the lasting margin to be acted on by the wipers.

Concomitantly with the closing of the switch 320, the switch 318 is opened to deenergize the solenoid 386, open the valve 378 and actuate the motor 152 to raise the carriage 148 and the toe pad 200 to provide overlasting pressure between the bottoms of the wipers and the upwardly facing surfaces of the lasting margin and insole as the wipers move across the insole.

At the end of the forward stroke of the wipers, the bar 44 has moved forwardly an amount sufficient to cause the screws 48 and 50 to actuate the switches 54 and 56. The actuation of the switch 54 moves it from terminal b to terminal a, to deenergize solenoid 408 and close the valve 410 and at the same time energizes a solenoid 412 to open a normally closed valve 414 to thereby actuate the motor 278 to unlock the heel clamp 222. The movement of the switch 54 to terminal a also energizes a solenoid 416 to open a normally closed valve 418 and cause additional air under pressure to pass by a line 419 to and through the valve 378 to the motor 152 and thereby cause additional bedding pressure to be applied by the motor 152 between the upwardly facing surface of the shoe and the bottoms of the wipers. This additional air is supplied through a regulator 421 set to pass air at a higher pressure than the regulator 423 which was previously supplying air to the motor 152. The movement of the switch 54 to terminal a also deenergizes the solenoid 404 to close the valve 406 and allow the springs in the motors 118 to retract the piston rods 120 and move the pincers 142 away from each other to their initial positions. The actuation of the switch 56, moves it from the terminal a or b with which it has been in contact up to this point to the other terminal to deenergize the solenoids 352 and 354 to open the valve 356 and close the valve 358 and thus cause the motors 138 to open the pincer jaws 126, 128 at the same time as the pincers 142 are moved outwardly. The lasting of the shoe is now completed and the switch blade at this time enters the notch 332 to turn off the motor 304 and stop the machine.

After the bedding pressure has been applied for a sufficient length of time, the switch 286 is again actuated to restart the motor 304 and resume the rotation of the cam shaft 306. The switch 322 is now closed to energize a solenoid 420 to open a normally closed valve 422 to supply air through a line 425 to the motor 152 to actuate the motor 152 to drive the carrage 148 downwardly to lower the shoe downwardly of the wipers. Concurrently with the closing of the switch 322, the switch 324 is closed to energize the solenoid 386 and thereby close the valve 378 to terminate the application of air pressure entering the motor 152 through the line 427 that had caused it to raise the carriage 148 and the toe rest 160 and allow the carriage and toe rest to descend.

The switches 314 and 316 are now concurrently opened. The opening of the switch 314 deenergizes the solenoid 374 to close the valve 376 to shut off the air pressure to the motor 106 that causes it to apply a downward pressure to the toe clamp 114. The opening of the switch 316 deenergizes the solenoid 382 to close the valve 384 to shut off the supply of air pressure to the motor 256 that causes it to press the heel clamp 122 against the shoe.

The switch 310 is now closed to energize the solenoid 400 to open the valve 402 and apply pressure to the motors 36, 106 and 256 to cause them to respectively retract the wipers 14, raise the toe clamp 114 and retract the heel clamp 222. The retraction of the wipers causes the screws 48 and 50 to leave the switches 54 and 56 causing switch 54 to move back to its terminal b. When the wipers have returned to their retracted position, the screw 46 closes the switch 52, but at this time in the machine cycle the switch 312 is temporarily opened so that the retarders will not again be lowered.

Shortly after the closing of the switch 310, the switches 322 and 324 are concurrently opened. The opening of the switch 322 deenergizes the solenoid 420 to close the valve 422 and the opening of the switch 324 deenergizes the solenoid 386 to open the valve 378, thus actuating the motor 152 to raise the carriage 148 and toe rest 160 to their initial position.

The notch 328 is now presented to the switch blade 334 causing the machine to stop. Shortly after the cam shaft starts rotating for a new cycle of operations, the switch 310 is opened to deenergize the solenoid 400 and close the valve 402 so that the toe clamp, heel clamp and wipers may be respectively actuated by the motors 106, 256 and 36 in their working strokes. The valve 364 acts as an emergency valve which, at any time, may be actuated to exhaust air from the system.

It should be understood that the present disclosure is for the purpose of illustration only and that this invention includes all modifications and equivalents which fall within the scope of the appended claims. It is to be understood that terms such as "bottom," "heightwise" and "horizontally" merely define the relative movements and locations of various parts and should be so construed.

We claim:

1. A shoe lasting machine comprising: a shoe support, mounted for vertical movement, for supporting bottom-up a last having a shoe upper and insole thereon; wiper means positioned rearwardly of the shoe support and mounted for horizontal movement from a retracted to a forward position; retarder means positioned above the wiper means and mounted for movement toward and away from the wiper means; a pincers support positioned on each side of the shoe support; a pincers located on each pincers support and positioned forwardly of the wiper means in its retracted position and above the shoe support, each pincers comprising a first jaw slidably mounted in the associated pincers support for movement toward and away from the center line of the last, a first motor mounted on the pincers support and connected to the jaw for effecting said movement of the jaw, a second jaw movably mounted on the first jaw for movement toward and away from the first jaw, and a second motor mounted on the first jaw and connected to the second jaw for effecting said movement of the second jaw; means for moving the retarder means toward the wiper means to press the toe portion of the upper margin against the wiper means; means for actuating the second motors to move the second jaws toward the first jaws to thereby cause the pincers to grip the forepart portions of the upper margin; means for lowering the shoe support an amount sufficient to bring the insole below the bottom of the wiper means; wiper drive means actuable to move the wiper means from its retracted to its forward position across the insole to wipe the toe portion of the upper margin down upon the insole; and means operative concomitantly with the actuation of the wiper drive means for actuating the first motors to cause the pincers to move toward each other.

2. A shoe lasting machine comprising: wiper means mounted for horizontal movement from a retracted to a forward position; a shoe support mounted for vertical movement forwardly of and adjacent the wiper means for supporting bottom-up a last having a shoe upper and insole thereon; retarder means positioned above the wiper means and movable into engagement with the wiper means; a pincers support positioned on each side of the shoe support; a pincers located on each pincers support and positioned forwardly of the wiper means in its retracted position and above the shoe support, each pincers comprising a first jaw slidably mounted in the associated pincers support for movement toward and away from the center line of the last, a first motor mounted on the pincers support and connected to the jaw effecting said movement of the jaw, a second jaw movably mounted on the first jaw for movement toward and away from the first jaw, and a second motor mounted on the first jaw and connected to the second jaw for effecting said movement of the second jaw; a toe clamp positioned above the shoe support mounted for vertical movement; means for moving the retarder means toward the wiper means to press the toe portion of the upper margin against the wiper means; means for actuating the second motors to move the second jaws toward the first jaws to thereby cause the pincers to grip the forepart portions of the upper margin; means for lowering the toe clamp into engagement with the insole to clamp the last and shoe between the shoe support and toe clamp and for then moving the shoe support and toe clamp downwardly in unison an amount sufficient to bring the insole below the bottom of the wiper means; wiper drive means actuable to move the wiper means from its retracted to its forward position across the insole to wipe the toe portion of the upper margin down upon the insole; and means operative concomitantly with the actuation of the wiper drive means for actuating the first motor to cause the pincers to move toward each other.

3. A shoe lasting machine comprising: a frame; wipers mounted in the frame for horizontal movement from a retracted position to a forward position; a toe pad mounted in the frame for vertical movement adjacent the wipers for supporting bottom-up a last having a shoe upper end insole thereon; a carriage connected to the toe pad to partake of its vertical movement; a heel clamp mounted on the carriage for movement toward and away from the last; a pincers support positioned on each side of the toe pad; a pincers located on each pincers support and positioned forwardly of the wipers in their retracted position and above the toe pad, each pincers comprising a first jaw slidably mounted in the associated pincers support for movement toward and away from the center line of the last, a first motor mounted on the pincers support and connected to the jaw for effecting said movement of the jaw, a second jaw movably mounted on the first jaw for movement toward and away from the first jaw, and a second motor mounted on the first jaw and connected to the second jaw for effecting said movement of the second jaw; at least one retarder mounted above the wipers for movement toward and away from the wipers; a toe clamp positioned above the toe pad mounted for movement toward and away from the insole; means for moving the retarder toward the wipers to press the toe portion of the upper margin against the wipers; means for actuating the second motors to move the second jaws toward the first jaws to thereby cause the pincers to grip the forepart of the upper margin; means for lowering the toe clamp into engagement with the insole to clamp the last and shoe between the toe pad and the toe clamp: means for moving the heel clamp into engagement with the heel portion of the upper; means for lowering the toe pad, toe clamp and heel clamp in unison an amount sufficient to bring the insole below the bottoms of the wipers; means for concomitantly moving the wipers forwardly across the insole to wipe the toe portion of the upper margin down upon the insole and actuating the first motors to cause the pincers to move toward each other over the insole; means operative as the wipers begin their forward movement to raise the retarder upwardly of the wipers; and means operative when the pincers terminate their inward movement to actuate the second motors to move the second jaws away from the first jaws.

4. A shoe lasting machine comprising: a frame; wipers mounted on the frame for horizontal movement from a retracted to a forward position; a wiper motor connected to said wipers for effecting their movement; a toe pad mounted in the frame for vertical movement adjacent the wipers for supporting bottom-up a last having a shoe upper and insole thereon; a carriage connected to the toe pad to partake of its vertical movement; a carriage motor connected to the toe pad to effect the vertical movement of the carriage and toe pad; a heel clamp mounted in the carriage for movement toward and away from the last; a heel clamp motor mounted on the carriage and connected to the heel clamp for effecting its movement; a heel locking means associated with the heel clamp for locking it against movement; a heel lock motor mounted in the carriage and connected to the heel locking means for actuating it; a pincers support positioned on each side of the toe pad; a pincers located on each pincers support and positioned forwardly of the wipers in their retracted position and above the toe pad, each pincers comprising a first jaw slidably mounted in the associated pincers support for movement toward and away from the center line of the last, a first motor mounted on the pincers support and connected to the jaw for effecting said movement of the jaw, a second jaw mounted on the first jaw for movement toward and away from the first jaw, and a second motor mounted on the first jaw and connected to the second jaw for effecting said movement of the second jaw; a center retarder and a pair of side retarders positioned above the wipers for movement toward and away from the wipers; a center retarder motor connected to the center retarder and a side retarder motor connected to each of the side retarders for effecting their movements; a toe clamp positioned above the toe pad mounted for movement toward and away from the insole; a toe clamp motor connected to the toe clamp for effecting its movement; means for actuating the second motors to move the second jaws toward the first jaws to thereby cause the pincers to grip the forepart portions of the upper margin; means for actuating the retarder motors to move the retarders toward the wipers and press the toe portion of the upper margin against the wipers; means for actuating the toe clamp motor to bring the toe clamp down against the insole and clamp the last and shoe between the toe pad and toe clamp; means for actuating the heel clamp motor to bring the heel clamp against the heel of the last and upper; means for actuating the carriage motor to enable the toe clamp motor to force the toe clamp, toe pad and carriage downwardly in unison an amount sufficient to bring the insole below the level of the wipers; means for concomitantly actuating the wiper motor to move the wipers forwardly across the insole to wipe the toe portion of the upper margin down upon the insole, the first motors to cause the pincers to move toward each other, and the heel lock motor to lock the heel clamp against movement; and means operative in response to the forward movement of the wipers to actuate the retarder motors to raise the retarders.

5. A shoe lasting machine comprising: wipers mounted for horizontal movement; a shoe support, for supporting bottom-up a last having a shoe upper and insole thereon, mounted for vertical movement adjacent the wiper means; a toe clamp positioned above the shoe support and mounted for vertical movement; at least one retarder positioned above the wipers and mounted for movement toward and away from the wipers; pincers mounted on each side of the shoe support for movement toward each other, each of said pincers having a pair of relatively moveable jaws; a first control member and a second control member; means responsive to actuation of said first control member for closing the pincers jaws to grip the forepart portions of the upper margin and for moving the retarder toward the wipers to press the toe portion of the upper margin against the wipers; means responsive to actuation of the second control member to lower the toe clamp against the insole and lower the shoe support and toe clamp in unison an amount sufficient to bring the insole below the bottoms of the wipers; and means responsive to a reactuation of the second control member to concomitantly move the wipers forwardly across the insole and to move the pincers toward each other.

6. The machine according to claim 5 having means responsive to reactuation of the first control member after its actuation and prior to the actuation of the second control member for opening the pincer jaws and moving the retarder away from the wipers.

7. The machine according to claim 5 having a third control member; and means responsive to actuation of the third control member, prior to the reactuation of the second control member and after the shoe support and clamp have been lowered in response to the initial actuation of the second control member, to raise the shoe support and toe clamp to their initial positions.

8. A shoe lasting machine comprising: wipers; means for moving the wipers horizontally; a shoe support positioned adjacent the wipers adapted to support a last having a shoe upper and insole thereon; means for moving the shoe support vertically; pincers located on each side of the support having relatively movable jaws thereon for gripping the forepart portion of the upper margin; first powered means for moving the retarder toward and away at least one retarder located above the wipers; second powered means for moving the retarder toward and away from the wipers; a control switch; means responsive to actuation of the switch to concomitantly cause the first powered means to close the pincers jaws and the second powered means to move the retarder against the wipers; and means responsive to a reactuation of the switch to cause the first powered means to open the pincers jaws and the second powered means to move the retarder away from the wipers.

9. A shoe lasting machine comprising: wipers; first powered means for moving the wipers horizontally; a shoe support positioned adjacent the wipers adapted to support a last having a shoe upper and insole thereon; second powered means for effecting relative heightwise movement of the shoe support and wipers; gripping means located adjacent the shoe support for gripping the upper margin during said relative heightwise movement; a control member; means responsive to actuation of the control member to actuate the second powered means to lower the shoe support with respect to the wipers; means responsive to reactuation of the control member to actuate the first powered means to move the wipers forwardly across the insole; a second optional control member; and means responsive to actuation of the second control member, after the shoe support has been lowered with respect to the wipers and prior to the forward movement of the wipers, to raise the shoe support with respect to the wipers back to its initial position.

10. In a lasting machine: horizontally movable wiping means; a vertical movable shoe support for supporting bottom-up a last having a shoe upper and insole thereon; a clamp positioned above the shoe support; a motor connected to said clamp operative to move the clamp upwardly away from the support and downwardly toward the support; a limit-stop means associated with said motor operative to limit the extent the motor may drive the clamp downwardly; means *for initially applying an upwardly directed force to the shoe support* to initially locate the shoe support so that the insole is above the bottom of the wiping means; [and] means for actuating the motor to lower the clamp against the insole; and *means for thereafter relieving said upwardly directed force to cause the motor to* force the clamp and shoe support downwardly in unison until the limit stop means is effective to stop the clamp movement, whereby the shoe is lowered an amount sufficient to bring the insole a predetermined amount below the bottom of the wiping means regardless of the thickness of the insole or the height of the last.

11. The lasting machine according to claim 10 also having means for gripping the margin of the upper during the downward movement of the shoe support, to stretch the upper heightwise of the last.

12. In a lasting machine: horizontally movable wiping means; a vertically movable shoe support for supporting bottom-up a last having a shoe upper and insole thereon; means for gripping the upper margin; a fluid pressure motor comprising a piston member and a cylinder member, one of which is movable relative to the other upon the application of fluid pressure, positioned above the support; a clamp connected to the movable motor member; means *for initially applying an upwardly directed force to the shoe support* to initially locate the shoe support so that the insole is above the bottom of the wiping means; [and] means to supply fluid pressure to the motor to move the movable motor member in a direction to lower the clamp against the insole; and *means for thereafter relieving said upwardly directed force to cause the motor* to [thereafter] lower the clamp and [insole] *shoe support* in unison until the movable motor member bottoms against the fixed motor member, whereby the shoe is lowered an amount sufficient to bring the insole a predetermined distance below the bottom of the wiping means regardless of the thickness of the insole or the height of the last.

13. In a lasting machine: a frame; wipers mounted in the frame for horizontal movement; a shoe support mounted in the frame for vertical movement, said shoe support being adapted to support bottom-up a last having a shoe upper and insole thereon; upper margin gripping means mounted in the frame; a cylinder mounted in the frame above the shoe support; a piston slidably mounted in the cylinder having a piston rod projecting downwardly of the cylinder; a toe clamp connected to the piston rod; means *for initially applying an upwardly directed force ot the shoe support* to initially locate the shoe support so that the insole is above the bottoms of the wipers; means for actuating the gripping means to grip the upper margin; means for supplying fluid pressure to the cylinder to lower the piston, piston rod and toe clamp until the toe clamp engages the insole; and *means* for thereafter [lowering] *relieving said upwardly directed force to cause the fluid pressure to lower* the toe clamp and shoe support in unison until the piston bottoms against the cylinder whereby the shoe is lowered an amount sufficient to bring the insole a predetermined amount below the bottoms of the wipers regardless of the thickness of the [wipers] *insole* or the height of the last.

14. The machine according to claim 13 wherein the toe clamp is adjustably secured to the piston rod.

15. The machine according to claim 13 wherein the piston rod is threaded and the toe clamp has a boss screwed on the piston rod.

16. The machine according to claim 13 wherein a vertically extending guideway is mounted in the frame and the toe clamp is slidably mounted in the guideway.

17. In a lasting machine: a frame; wipers mounted in the frame for horizontal movement; a carriage motor mounted in the frame below the wipers comprising a stationary cylinder and a piston rod projecting upwardly of the cylinder; means on the frame vertically guiding the piston rod; a toe pad secured to the top of the piston rod for supporting bottom-up a last having a shoe upper and insole thereon; a carriage connected to the piston rod to partake of its vertical movement; a heel clamp movably mounted on the carriage for engaging the heel of the upper; upper margin gripping means mounted in the frame; a toe clamp motor comprising a cylinder supported on the frame above the wipers and a piston rod projecting downwardly of the cylinder; a toe clamp connected to the toe clamp motor piston rod; means to supply fluid pressure to the carriage motor to initially locate the toe pad and carriage so that the insole is above the bottoms of the wipers; means to actuate the gripping means to grip the margin of the upper; means to supply fluid pressure to the toe clamp motor to lower the toe clamp into engagement with the upper; means to move the heel clamp to cause it to bear against the heel of the last and upper; and means to thereafter exhaust the fluid pressure supplied to the carriage motor so that the toe clamp motor causes the toe clamp, toe pad and carriage to move downwardly in unison while the upper margin is gripped by the gripping means until the toe clamp motor piston bottoms against the toe clamp motor cylinder whereby the shoe is lowered an amount sufficient to bring the insole a predetermined amount below the bottoms of the wipers regardless of the thickness of the [wipers] *insole* or the height of the last.

18. In a machine having a toe pad adapted to engage the vamp of a shoe upper mounted on a last; and means for urging the last against the toe pad; the improvement comprising: means pivotally mounting the toe pad for swinging movement about an axis substantially transverse to the longitudinal dimension of the last and substantially parallel to *the* bottom of the last.

19. In a lasting machine having wiping means mounted for movement in a predetermined plane; a toe pad adapted to engage the vamp of a shoe upper mounted on a last; and means for urging the last against the toe pad;

the improvement comprising: means pivotally mounting the toe pad for swinging movement about an axis substantially transverse to the longitudinal dimension of the last and substantially parallel to the plane of movement of the wiping means.

20. In a lasting machine having wiper means mounted for movement in a predetermined plane; a toe pad adapted to engage the vamp of a shoe upper mounted on a last; and means for urging the last against the toe pad; the improvement comprising: a clevis block having a clevis; a pin rotatably mounted on the clevis for swinging movement about an axis substantially transverse to the longitudinal dimension of the last and substantially parallel to the plane of movement of the wiping means; and means connecting the toe pad to the pin.

21. In a lasting machine having wiping means mounted for movement in a predetermined plane; a toe pad, adapted to engage the vamp of a shoe upper mounted on a last; and means for urging the last against the toe pad; the improvement comprising: a clevis block having a flat surface; and a pad block, on which the pad is supported, pivotally mounted on the clevis block for swinging movement about an axis substantially transverse to the longitudinal dimension of the last and substantially parallel to the plane of movement of the wipers; said pad block having upwardly sloping diverging surfaces adapted to engage said clevis block surface and thereby limit the degree that the pad block may swing.

22. A toe rest comprising: a clevis block; a clevis projecting upwardly of the clevis block; a pin rotatably mounted in the clevis; a pad block having legs straddling the clevis, each of said legs having a hole which receives an end of the pin; means locking the pad block to the pin; and a toe pad supported on the pad block.

23. The toe rest according to claim 22 wherein the clevis block has a flat upper surface and the pad block has converging sloping bottom surfaces adapted to engage the clevis block surface and limit the degree of swinging of the pad block about the axis of the pin.

24. In a lasting machine having a pair of symmetrically disposed end embracing wipers mounted for forward and converging movement in a predetermined plane; a toe pad adapted to engage the vamp of a shoe upper mounted on a last; and means for urging the last against the toe pad; the improvement comprising: means mounting the toe pad for adjustment in a direction parallel to the line of symmetry of the wipers and the plane of movement of the wipers; and means pivotally mounting the toe pad for swinging movement about an axis transverse to the line of symmetry of the wipers and parallel to the plane of movement of the wipers.

25. The machine according to claim 24 wherein the toe pad adjusting means comprises: a toothed toe post plate; a toothed toe rest plate meshing with the first plate; at least one elongate slot in the toe rest plate; a threaded stud extending through said slot and screwed into the toe rest plate, said stud having a head on its lower end located below the toe post plate; and a compression spring coiled about the stud and interposed between the head and the toe rest plate.

26. A shoe lasting machine comprising: a pair of symmetrically disposed end embracing wipers mounted for movement in a horizontal plane; a vertically movable rod; a carriage connected to the rod to partake of its vertical movement; a toe pad adapted to support the vamp of an upper mounted on a last; means pivotally connecting the toe pad to the upper end of the rod for swinging movement about a horizontal axis transverse to the line of symmetry of the wipers; a heel clamp movably mounted on the carriage; means for moving the heel clamp into engagement with the heel of the upper; a toe clamp located above the toe pad; and means for moving the toe clamp downwardly into engagement with an insole mounted on the last bottom.

27. A clamp moving and locking mechanism comprising: a guideway; a plate slidably mounted in the guideway; a rack connected to the plate; a rotatably mounted drive gear geared to said rack; means for rotating the drive gear to thereby move the plate in the guideway; a pinion connected to the drive gear to rotate therewith; and means to lock the pinion against movement and thereby lock the plate against movement.

28. A clamp moving and locking mechanism comprising: a guideway; a plate slidably mounted in the guideway; a rack connected to the plate; a rotatably mounted drive gear geared to said rack; a motor connected to the drive gear to effect its rotation to thereby move the plate in the guideway; a second gear mounted to rotate with the drive gear; a pinion in mesh with the second gear; and means to lock the pinion against movement and thereby lock the plate against movement.

29. A heel clamp comprising: a carriage having a side wall; a guideway at the top of the carriage; a clamp carrying plate slidably mounted in the guideway; a rack depending from the plate; a rotatably mounted shaft extending through said side wall; a drive gear, fixed to said shaft within the carriage, geared to the rack; powered means connected to said gear to effect its rotation and thereby move the plate in the guideway; a second gear fixed to the shaft exteriorly of the side wall; a pinion, located exteriorly of the side wall, geared to said second gear; and means for pressing the pinion against the side wall to thereby lock the pinion against rotation and accordingly lock the plate against movement in the guideway.

30. A heel clamp comprising: a carriage having a side wall; a guideway at the top of the carriage; a clamp carrying plate slidably mounted in the guideway; a rack depending from the plate; a rotatably mounted shaft extending through said side wall; a drive gear, fixed to said shaft within the carriage, geared to the rack; powered means in the carriage connected to said gear to effect its rotation and thereby move the plate in the guideway; a second gear fixed to the shaft exteriorly of the side wall; a second shaft slidably mounted in the side wall; a pinion, rotatably mounted on the second shaft exteriorly of the side wall, geared to the second gear; and means for shifting the second shaft inwardly of the carriage to press the pinion against the side wall and thereby lock the pinion against rotation and accordingly lock the plate against movement in the guideway.

31. A heel clamp comprising: a carriage having a side wall; a guideway at the top of the carriage; a clamp carrying plate slidably mounted in the guideway; a rack depending from the plate; a rotatably mounted shaft extending through said side wall; a drive gear fixed to said shaft within the carriage, geared to the rack; powered means in the carriage connected to said gear to effect its rotation and thereby move the plate in the guideway; a second gear fixed to the shaft exteriorly of the side wall; a second shaft slidably mounted in the side wall, said second shaft having an enlarged head at the end extending outwardly of the side wall; a pinion rotatably mounted on the second shaft and having a socket embracing the enlarged head; and powered means in the carriage connected to the second shaft to shift it inwardly of the carriage to press the pinion against the side wall and thereby lock the pinion against rotation and accordingly lock the plate against movement in the guideway.

32. A heel clamp comprising: a carriage having a side wall; a guideway at the top of the carriage; a clamp carrying plate slidably mounted in the guideway; a rack depending from the plate; a rotatably mounted shaft extending through said side wall; a drive gear, fixed to said shaft within the carriage, geared to the rack; powered means in the carriage connected to said gear to effect its rotation and thereby move the plate in the guideway; a second gear fixed to the shaft exteriorly of the side wall; a second shaft slidably mounted in the side wall, said second shaft having an enlarged head at the end extending outwardly of the side wall; a pinion rotatably mounted on the second shaft and having a socket embracing the enlarged head; a link, having an eccentric cam portion bearing against the interior wall surface, pivotally connected to the second shaft; and powered means connected to the link to force the larger radius portion of the eccentric cam against the wall to shift the second shaft inwardly of the carriage, press the pinion against the side wall, and thereby lock the pinion against rotation and accordingly lock the plate against movement in the guideway.

33. A shoe lasting machine comprising: a pair of symmetrically disposed end embracing wipers; means for moving the wipers forwardly and inwardly in a predetermined plane; a gauge located immediately above and in the plane of symmetry of the wipers; a shoe support for supporting bottom-up a last having a shoe upper and insole thereon; means for imparting relative heightwise movement to the shoe support and wipers; and means for gripping the margin of the upper during said relative heightwise movement.

34. A shoe lasting machine comprising: a pair of symmetrically disposed end embracing wipers; means for effecting forward and inward movement of the wipers; a shoe support located adjacent said wipers for supporting bottom-up a last having a shoe upper and insole thereon; means for effecting heightwise movement of the shoe support; means for gripping the margin of the upper during said heightwise movement; and a gauge located immediately above and in the plane of symmetry of the wipers.

35. The machine according to claim 34 wherein the gauge rests directly on the wipers.

36. The machine according to claim 34 having means for adjusting the gauge forwardly or rearwardly along the line of symmetry of the wipers.

37. The machine according to claim 36 wherein the gauge rests directly on the wipers and has a threaded rod screwed into a rotatably mounted shaft; and the adjusting means comprises means to rotate the shaft.

38. A lasting machine comprising: a pair of symmetrically disposed wipers mounted for movement in a predetermined plane; a gauge disposed along the plane of symmetry of the wipers and immediately above the wipers; a threaded rod on the gauge; a hollow shaft into which the gauge is screwed; a gear connected to the shaft; and a second rod geared to the gear, whereby rotation of the second rod causes the gauge to be adjusted along said plane of symmetry.

39. A lasting machine having wiper means mounted for movement from a retracted position to a forward position; a shoe support located forwardly of the wiper means for supporting bottom-up a last having an upper mounted thereon and an insole located on its bottom; a pincers support positioned on each side of the shoe support; and a pincers located on each pincers support and positioned forwardly of the wiper means in its retracted position and above the shoe support; each of said pincers comprising: a first jaw slidably mounted in the associated pincers support for movement towards and away from the center line of the last; a first motor mounted on the pincers support and connected to the jaw for effecting said movement of the jaw; a second jaw movably mounted on the first jaw for movement toward and away from the first jaw; and a second motor mounted on the first jaw and connected to the second jaw for effecting said movement of the second jaw.

40. A lasting machine having wiper means mounted for movement from a retracted to a forward position; a shoe support located forwardly of the wiper means for supporting bottom-up a last having an upper mounted thereon and an insole located on its bottom; a pincers support positioned on each side of the shoe support and a pincers located on each pincers support and positioned forwardly of the wiper means in its retracted position; each of said pincers comprising: a bar slidably mounted in the associated pincers support for movement toward and away from the center line of the last; a first jaw on the end of the bar facing the last; a first fluid actuated motor mounted on the associated pincers support and connected to the bar for effecting said movement of the bar; a second jaw swingably mounted on the bar for movement toward and away from the first jaw; and a second fluid actuated motor mounted on the bar and connected to the second jaw to reflecting said movement of the second jaw.

41. A pincers assembly comprising: a pincers support; a first jaw slidably mounted for movement in the support; a first motor mounted on the pincers support and connected to the jaw for effecting said movement of the jaw; a second jaw movably mounted on the first jaw for movement toward and away from the first jaw; and a second motor mounted on the first jaw and connected to the second jaw for effecting said movement of the second jaw.

42. A pincers assembly comprising: a pincers support; a bar slidably mounted for movement in the pincers support; a first jaw on one end of the bar; a first fluid actuated motor mounted on the pincers support and connected to the bar for effecting said movement of the bar; a second jaw swingably mounted on the bar for movement toward and away from the first jaw; and a second fluid actuated motor mounted on the bar and connected to the second jaw for effecting said movement of the second jaw.

[43. In a lasting machine: horizontally movable wiping means for wiping a shoe upper mounted on a last supported bottom-up against a shoe insole located on the last bottom; an insole engaging member positioned above the insole adapted to impart downward movement to the last; a motor connected to said insole engaging member to effect said downward movement; a limit-stop means associated with said motor operative to limit the extent the motor may drive the insole engaging member downwardly; means to initially locate the last so that the insole is above the bottom of the wiping means; and means for actuating the motor to cause the insole engaging member to force the last downwardly until the limit-stop means is effective to stop the movement of the insole engaging, member whereby the last is lowered an amount sufficient to bring the insole a predetermined amount below the bottom of the wiping means regardless of the thickness of the insole or the height of the last.]

[44. The lasting machine according to claim 43 further comprising: upper margin gripping means; and means for imparting relative downward movement of the last with respect to the gripping means to stretch the upper heightwise of the last.]

45. A toe lasting machine comprising: wiper means mounted for forward movement from a retracted to a forward position; a shoe support, mounted for heightwise movement, for supporting bottom-up a last having an insole located on its bottom and an upper mounted thereon with the toe end of the upper facing the wiper means; retarder means located adjacent to and above the wiper means adapted to grip the toe portion of the upper margin; a pincers support positioned on each side of the shoe support; a pincers located on each pincers support and positioned forwardly of the wiper means in its retracted position, forwardly of the retarder means and above the shoe support, each pincers comprising a first jaw slidably mounted in the associated pincers support for movement toward and away from the center line of the last, a first motor mounted on the pincers support and connected to the jaw for effecting said movement of the jaw, a second jaw movably mounted on the first jaw for movement toward and away from the first jaw, and a second motor mounted on the first jaw and connected to the second jaw for effecting said movement of the second jaw; means for causing the retarder means to grip the toe portion of the upper margin; means for actuating the second motors to move the second jaws toward the first jaws to thereby cause each pincers to grip a forepart portion of the upper margin; means for lowering the shoe support from an initial position wherein the insole is above the bottom of the wiper means an amount sufficient to bring the insole below the bottom of the wiper means; means for actuating the first motors to cause the pincers to move toward each other to lay the gripped forepart margin portions in over the insole; and means for moving the wiper means forwardly over the toe end of the last to wipe the toe end of the upper against the insole while the forepart portions of the upper are layed in over the insole.

46. The machine according to claim 45 further comprising: control means operative to move the wiper means forwardly concomitantly with the actuation of the first motors.

47. A shoe end lasting machine comprising: wiper means mounted for forward movement from a retracted to a forward position; a shoe support located forwardly of the wiper means for supporting bottom-up a last having an insole located on its bottom and an upper mounted thereon with an end of the last and upper facing the wiper means; a pincers support positioned on each side of the shoe support; a pincers located on each pincers support and positioned forwardly of the wiper means in its retracted position and above the shoe support, each pincers comprising a first jaw slidably mounted in the associated pincers support for movement toward and away from the center line of the last, a first motor mounted on the pincers support and connected to the jaw for effecting said movement of the jaw, a second jam moveably mounted on the first jaw for movement toward and away from the first jaw, and a second motor mounted on the first jaw and connected to the second jaw for effecting said movement of the second jaw; control means operative to actuate the second motors to move the second jaws toward the first jaws to thereby cause each pincers to grip a portion of the margin of the upper located forwardly of said end of the upper and then actuate the first motors to cause the pincers to move toward each other across the insole to lay the gripped upper portions in over the insole; and means for moving the wiper means forwardly over said end of the last to wipe said end of the upper down against the insole while said portions of the upper are layed in over the insole.

48. A clamp moving and locking mechanism comprising: a guideway; a plate slidably mounted in the guideway; a rack connected to the plate; a rotatably mounted drive gear geared to the rack; means for rotating the drive gear to thereby move the plate in the guideway; a wall; a pinion, located adjacent the wall, connected to the drive gear to rotate therewith; and means for pressing the pinion against the wall to thereby lock the pinion against rotation and accordingly lock the plate against movement in the guideway.

References Cited by the Examiner

The following references, cited by the Examiner, are of record in the patented file of this patent or of the original patent.

UNITED STATES PATENTS

| | | | |
|---|---|---|---|
| 1,010,800 | 12/1911 | Pym | 12—14.2 |
| 1,274,590 | 8/1918 | Pym | 12—10.5 |
| 1,830,369 | 11/1931 | McIntosh | 74—422 |
| 2,235,887 | 3/1941 | Kamborian | 12—145 |
| 2,341,837 | 2/1944 | Andrews | 200—160 |
| 2,428,062 | 9/1947 | Burby | 12—8.8 |
| 2,768,395 | 10/1956 | Pulford | 12—8.8 |
| 2,768,396 | 10/1956 | Jorgensen | 12—10.5 |
| 2,891,265 | 6/1959 | Dunlap | 12—123 X |
| 2,898,615 | 8/1959 | Chapelle | 12—145 |
| 2,933,744 | 4/1960 | Lotarski et al. | 12—20 |
| 2,962,735 | 12/1960 | Gulbrandsen | 12—1 |
| 2,986,753 | 6/1961 | Gilbride | 12—12.4 X |

FOREIGN PATENTS

| | | |
|---|---|---|
| 7,005 | 4/1901 | Great Britain. |
| 12,304 | 7/1904 | Great Britain. |
| 18,163 | 8/1910 | Great Britain. |
| 18,270 | 8/1910 | Great Britain. |
| 174,431 | 1/1922 | Great Britain. |
| 340,310 | 12/1930 | Great Britain. |
| 803,884 | 11/1958 | Great Britain. |

PATRICK D. LAWSON, *Primary Examiner.*